(12) United States Patent
Shapiro et al.

(10) Patent No.: US 11,860,601 B2
(45) Date of Patent: *Jan. 2, 2024

(54) CALIBRATION OF A COMPUTER-NUMERICALLY-CONTROLLED MACHINE

(71) Applicant: Glowforge Inc., Seattle, WA (US)

(72) Inventors: Daniel Shapiro, Mercer Island, WA (US); Mark Gosselin, Seattle, WA (US); Anthony Wright, Seattle, WA (US); Kevin McVey, Seattle, WA (US); Jared Kofron, Vashon, WA (US); Daniel Martinec, Kirkland, WA (US); Brian Fioca, Seattle, WA (US); Taylor Vaughn, Seattle, WA (US)

(73) Assignee: Glowforge Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/463,857

(22) Filed: Sep. 1, 2021

(65) Prior Publication Data
US 2022/0057770 A1 Feb. 24, 2022

Related U.S. Application Data

(63) Continuation of application No. 15/823,511, filed on Nov. 27, 2017, now Pat. No. 11,137,738.
(Continued)

(51) Int. Cl.
*G05B 19/19* (2006.01)
*G05B 19/402* (2006.01)

(52) U.S. Cl.
CPC .......... *G05B 19/19* (2013.01); *G05B 19/402* (2013.01); *G05B 2219/40607* (2013.01); *G05B 2219/41092* (2013.01)

(58) Field of Classification Search
CPC .............. G05B 19/19; G05B 19/402; G05B 2219/40607; G05B 2219/41092
(Continued)

(56) References Cited

U.S. PATENT DOCUMENTS 3,721,811 A 3/1973 Taylor et al.
3,967,176 A 6/1976 Wagener et al.
(Continued)

FOREIGN PATENT DOCUMENTS

CN 1364033 A 8/2002
CN 101095033 A 12/2007
(Continued)

OTHER PUBLICATIONS

Barbosa, W. et al. (Jan. 1, 2012), "Samba Reception Desk: Compromising Aesthetics, Fabrication and Structural Performance in the Design Process,", Digital Aids to Design Creativity, vol. 2, eCAADe 30, pp. 245-254. XP055844557, Retrieved from the Internet:URL:http://papers.cumincad.org/data/works/att/ecaade2012_163.content.pdf [retrieved on Sep. 24, 2021].
(Continued)

*Primary Examiner* — Charles Cai
(74) *Attorney, Agent, or Firm* — LEE SULLIVAN SHEA & SMITH LLP

(57) ABSTRACT

A method for calibrating a computer-numerically-controlled machine can include capturing one or more images of at least a portion of the computer-numerically-controlled machine. The one or more images can be captured with at least one camera located inside an enclosure containing a material bed. A mapping relationship can be created which maps a pixel in the one or more images to a location within the computer-numerically controlled machine. The creation of the mapping relationship can include compensating for a difference in the one or more images relative to one or more
(Continued)

physical parameters of the computer-numerically-controlled machine and/or a material positioned on the material bed. Related systems and/or articles of manufacture, including computer program products, are also provided.

20 Claims, 17 Drawing Sheets

Related U.S. Application Data

(60) Provisional application No. 62/426,437, filed on Nov. 25, 2016.

(58) Field of Classification Search
USPC .................................................. 359/726, 809
See application file for complete search history.

(56) References Cited

U.S. PATENT DOCUMENTS

| | | |
|---|---|---|
| 4,055,787 A | 10/1977 | Beadle et al. |
| 4,138,718 A | 2/1979 | Toke et al. |
| 4,383,762 A | 5/1983 | Burkert |
| 4,518,843 A | 5/1985 | Antol et al. |
| 4,589,729 A | 5/1986 | Bridges et al. |
| 4,650,287 A | 3/1987 | Kudo et al. |
| 4,723,219 A | 2/1988 | Beyer et al. |
| 4,863,538 A | 9/1989 | Deckard |
| 4,894,831 A | 1/1990 | Alfrey |
| 4,901,359 A | 2/1990 | Bruder |
| 4,918,611 A | 4/1990 | Shyu et al. |
| 4,998,260 A | 3/1991 | Taniura |
| 5,298,843 A | 3/1994 | Miyajima et al. |
| 5,355,250 A | 10/1994 | Grasso et al. |
| 5,396,279 A | 3/1995 | Vossen |
| 5,475,521 A | 12/1995 | Heidemann |
| 5,585,018 A | 12/1996 | Kanaoka et al. |
| 5,682,319 A | 10/1997 | Boland et al. |
| 5,756,961 A | 5/1998 | Sato et al. |
| 6,031,200 A | 2/2000 | Whitehouse |
| 6,085,122 A | 7/2000 | Manning |
| 6,087,625 A | 7/2000 | Iso |
| 6,284,999 B1 | 9/2001 | Virtanen et al. |
| 6,326,586 B1 | 12/2001 | Heyerick et al. |
| 6,420,674 B1 | 7/2002 | Cole, III et al. |
| 6,420,675 B1 | 7/2002 | Lizotte et al. |
| 6,483,596 B1 | 11/2002 | Philippi et al. |
| 6,498,653 B1 | 12/2002 | Wang |
| 6,528,758 B2 | 3/2003 | Shaffer |
| 6,609,044 B1 | 8/2003 | Basista et al. |
| 6,628,322 B1 | 9/2003 | Cerruti |
| 6,696,667 B1 | 2/2004 | Flanagan |
| 7,005,606 B2 | 2/2006 | Legge et al. |
| 7,456,372 B2 | 11/2008 | Hiramatsu |
| 8,111,904 B2 | 2/2012 | Wallack et al. |
| 8,136,432 B2 | 3/2012 | Travez et al. |
| 8,786,928 B2 | 7/2014 | Dolleris et al. |
| 8,809,780 B2 | 8/2014 | Wollenhaupt et al. |
| 8,921,734 B2 | 12/2014 | Yerazunis et al. |
| 9,020,628 B2 | 4/2015 | Fagan |
| 9,114,478 B2 | 8/2015 | Scott et al. |
| 9,235,205 B2 | 1/2016 | Prestidge et al. |
| 9,469,338 B2 | 10/2016 | Norberg Ohlsson |
| 9,618,926 B1 | 4/2017 | Louette et al. |
| 9,734,419 B1 | 8/2017 | Ye et al. |
| 9,772,067 B2 | 9/2017 | Bunz et al. |
| 9,782,906 B1 | 10/2017 | Aminpour et al. |
| 9,912,915 B2 | 3/2018 | Sinclair |
| 9,987,798 B2 | 6/2018 | Tyler |
| 10,106,864 B2 | 10/2018 | Zeng et al. |
| 10,234,260 B2 | 3/2019 | Siercks et al. |
| D850,528 S | 6/2019 | Gosselin et al. |
| 10,557,701 B2 | 2/2020 | Jiang et al. |
| 10,578,851 B2 | 3/2020 | Fletcher et al. |
| 10,642,251 B2 | 5/2020 | Platts et al. |
| 10,950,471 B2 | 3/2021 | Shionoya |
| 10,953,496 B2 | 3/2021 | Mauersberger |
| 2001/0012973 A1 | 8/2001 | Wehrli et al. |
| 2002/0129485 A1 | 9/2002 | Mok et al. |
| 2002/0144987 A1 | 10/2002 | Tomlinson et al. |
| 2003/0049373 A1 | 3/2003 | Van De Rijdt et al. |
| 2004/0029493 A1 | 2/2004 | Tricard et al. |
| 2004/0060910 A1 | 4/2004 | Schramm |
| 2004/0207831 A1* | 10/2004 | Aoyama ................ G01C 3/18 356/3 |
| 2004/0223165 A1 | 11/2004 | Kurokawa et al. |
| 2004/0245227 A1 | 12/2004 | Grafton-Reed et al. |
| 2005/0051523 A1 | 3/2005 | Legge et al. |
| 2005/0069682 A1 | 3/2005 | Tseng |
| 2005/0071020 A1 | 3/2005 | Yamazaki et al. |
| 2005/0115941 A1 | 6/2005 | Sukhman et al. |
| 2005/0142701 A1 | 6/2005 | Yamaguchi et al. |
| 2005/0187651 A1 | 8/2005 | Kimura et al. |
| 2006/0022379 A1 | 2/2006 | Wicker et al. |
| 2006/0043615 A1 | 3/2006 | Zheng et al. |
| 2007/0000889 A1 | 1/2007 | Yamazaki et al. |
| 2007/0032733 A1 | 2/2007 | Burton |
| 2007/0034615 A1 | 2/2007 | Kleine |
| 2007/0181544 A1 | 8/2007 | Sukhman et al. |
| 2008/0058734 A1 | 3/2008 | Hanft et al. |
| 2008/0100829 A1 | 5/2008 | Watson |
| 2008/0101687 A1 | 5/2008 | Goeller |
| 2008/0149604 A1 | 6/2008 | Varriano-Marston et al. |
| 2008/0160254 A1 | 7/2008 | Arnold |
| 2008/0218735 A1 | 9/2008 | Atsumi et al. |
| 2008/0243299 A1 | 10/2008 | Johnson et al. |
| 2008/0249653 A1 | 10/2008 | Ichikawa |
| 2009/0060386 A1 | 3/2009 | Cooper et al. |
| 2009/0120914 A1 | 5/2009 | Lawrence |
| 2009/0250445 A1 | 10/2009 | Yamaguchi et al. |
| 2009/0308851 A1 | 12/2009 | Harnisch et al. |
| 2010/0063603 A1 | 3/2010 | Chandhoke |
| 2010/0081971 A1 | 4/2010 | Allison |
| 2010/0149337 A1 | 6/2010 | Porcino |
| 2010/0193482 A1 | 8/2010 | Ow et al. |
| 2010/0193483 A1 | 8/2010 | Chen et al. |
| 2010/0262590 A1 | 10/2010 | Holt |
| 2010/0274379 A1 | 10/2010 | Hehl |
| 2010/0292947 A1 | 11/2010 | Buk |
| 2010/0301023 A1 | 12/2010 | Unrath et al. |
| 2010/0326962 A1 | 12/2010 | Calla et al. |
| 2011/0005458 A1 | 1/2011 | Cunningham |
| 2011/0080476 A1 | 4/2011 | Dinauer et al. |
| 2011/0108533 A1 | 5/2011 | Boettcher et al. |
| 2011/0127333 A1 | 6/2011 | Veksland et al. |
| 2011/0127697 A1 | 6/2011 | Milne |
| 2011/0135208 A1 | 6/2011 | Atanassov et al. |
| 2011/0193943 A1 | 8/2011 | Campbell |
| 2011/0286007 A1 | 11/2011 | Pangrazio et al. |
| 2011/0316977 A1 | 12/2011 | Pienaar |
| 2012/0026249 A1 | 2/2012 | Kihira et al. |
| 2012/0035745 A1 | 2/2012 | Mori et al. |
| 2012/0109590 A1 | 5/2012 | Trainer et al. |
| 2012/0117787 A1 | 5/2012 | Sun et al. |
| 2012/0120232 A1 | 5/2012 | Nishikawa |
| 2012/0197427 A1* | 8/2012 | Gallucci ................ B26D 5/005 382/141 |
| 2012/0293821 A1 | 11/2012 | Chiba |
| 2013/0158957 A1 | 6/2013 | Lee et al. |
| 2013/0178972 A1* | 7/2013 | Goldsmith ............. B23K 26/38 700/166 |
| 2013/0190898 A1 | 7/2013 | Shilpiekandula et al. |
| 2013/0200053 A1 | 8/2013 | Bordatchev |
| 2013/0211391 A1 | 8/2013 | BenYakar et al. |
| 2013/0304248 A1 | 11/2013 | Lange et al. |
| 2014/0005804 A1 | 1/2014 | Brand |
| 2014/0018779 A1 | 1/2014 | Worrell et al. |
| 2014/0032706 A1 | 1/2014 | Kuscher et al. |
| 2014/0039707 A1 | 2/2014 | Curtis et al. |
| 2014/0046131 A1 | 2/2014 | Morita et al. |
| 2014/0071330 A1 | 3/2014 | Zhang et al. |
| 2014/0071486 A1 | 3/2014 | Van Bauwel |
| 2014/0071502 A1 | 3/2014 | Liu |
| 2014/0160273 A1 | 6/2014 | Jedynak et al. |

(56) References Cited

U.S. PATENT DOCUMENTS

| | | |
|---|---|---|
| 2014/0168293 A1 | 6/2014 | Moreau et al. |
| 2014/0168302 A1 | 6/2014 | Ngo et al. |
| 2014/0268607 A1 | 9/2014 | Wicker et al. |
| 2014/0299586 A1 | 10/2014 | Sawabe et al. |
| 2014/0310122 A1 | 10/2014 | Danielson et al. |
| 2014/0327687 A1 | 11/2014 | Murakami |
| 2014/0330424 A1 | 11/2014 | Garaas et al. |
| 2014/0368348 A1 | 12/2014 | Lin |
| 2014/0371895 A1 | 12/2014 | Sadusk et al. |
| 2015/0030821 A1 | 1/2015 | Costin, Sr. et al. |
| 2015/0107033 A1 | 4/2015 | Chang et al. |
| 2015/0108095 A1 | 4/2015 | Kruer et al. |
| 2015/0112470 A1 | 4/2015 | Chang et al. |
| 2015/0127137 A1 | 5/2015 | Brandt et al. |
| 2015/0136949 A1 | 5/2015 | De Nooij et al. |
| 2015/0154453 A1 | 6/2015 | Wilf |
| 2015/0158121 A1 | 6/2015 | Di Cairano et al. |
| 2015/0158311 A1 | 6/2015 | Ogasawara et al. |
| 2015/0197064 A1 | 7/2015 | Walker et al. |
| 2015/0212421 A1 | 7/2015 | deVilliers et al. |
| 2015/0228069 A1 | 8/2015 | Fresquet et al. |
| 2015/0245549 A1 | 8/2015 | Kurita et al. |
| 2015/0301327 A1 | 10/2015 | Okugawa et al. |
| 2015/0301444 A1 | 10/2015 | Singh et al. |
| 2015/0355621 A1 | 12/2015 | Ikeda et al. |
| 2015/0360318 A1 | 12/2015 | Aubry |
| 2015/0378348 A1 | 12/2015 | Gupta et al. |
| 2016/0023486 A1 | 1/2016 | Priyadarshi |
| 2016/0059371 A1 | 3/2016 | Chang et al. |
| 2016/0084649 A1 | 3/2016 | Yamazaki et al. |
| 2016/0093540 A1 | 3/2016 | Liu et al. |
| 2016/0147213 A1 | 5/2016 | Murakami |
| 2016/0156771 A1 | 6/2016 | Lee |
| 2016/0193698 A1 | 7/2016 | Hildebrand et al. |
| 2016/0199945 A1 | 7/2016 | McDowell et al. |
| 2016/0210737 A1 | 7/2016 | Straub et al. |
| 2016/0271718 A1 | 9/2016 | Fagan |
| 2016/0303845 A1 | 10/2016 | Arce |
| 2016/0325541 A1 | 11/2016 | Lavrentyev et al. |
| 2016/0349038 A1 | 12/2016 | Ohtsuka et al. |
| 2016/0360409 A1 | 12/2016 | Singh |
| 2016/0367336 A1 | 12/2016 | Lv et al. |
| 2016/0368089 A1 | 12/2016 | Grapov et al. |
| 2016/0372349 A1 | 12/2016 | Hyakumura |
| 2017/0008127 A1 | 1/2017 | Hyatt et al. |
| 2017/0045877 A1 | 2/2017 | Shapiro et al. |
| 2017/0045879 A1 | 2/2017 | Yang et al. |
| 2017/0051429 A1 | 2/2017 | Sachs et al. |
| 2017/0057008 A1* | 3/2017 | Liu .................. G06T 7/0004 |
| 2017/0123362 A1 | 5/2017 | Masui et al. |
| 2017/0173888 A1 | 6/2017 | Thomas-Lepore et al. |
| 2017/0203390 A1 | 7/2017 | Kato |
| 2017/0235293 A1 | 8/2017 | Shapiro et al. |
| 2017/0235294 A1 | 8/2017 | Shapiro et al. |
| 2017/0243374 A1 | 8/2017 | Matsuzawa |
| 2017/0304897 A1 | 10/2017 | Walrand et al. |
| 2017/0341183 A1 | 11/2017 | Buller et al. |
| 2018/0001565 A1 | 1/2018 | Hocker |
| 2018/0113434 A1 | 4/2018 | Shapiro et al. |
| 2018/0147657 A1 | 5/2018 | Shapiro |
| 2018/0147658 A1 | 5/2018 | Shapiro |
| 2018/0147659 A1 | 5/2018 | Shapiro |
| 2018/0150047 A1 | 5/2018 | Shapiro |
| 2018/0150055 A1 | 5/2018 | Shapiro |
| 2018/0150058 A1 | 5/2018 | Shapiro |
| 2018/0150062 A1 | 5/2018 | Shapiro |
| 2018/0369964 A1 | 12/2018 | Grapov et al. |
| 2019/0014307 A1 | 1/2019 | McNamer et al. |
| 2019/0054644 A1* | 2/2019 | Hansen .................. G05B 19/402 |
| 2019/0058870 A1 | 2/2019 | Rowell et al. |
| 2019/0148028 A1 | 5/2019 | Ravenhall et al. |
| 2019/0232357 A1 | 8/2019 | Angerer et al. |
| 2019/0278250 A1 | 9/2019 | Clement et al. |
| 2019/0310604 A1 | 10/2019 | Shapiro et al. |
| 2020/0039002 A1 | 2/2020 | Sercel et al. |
| 2020/0064806 A1 | 2/2020 | Shapiro et al. |
| 2020/0073362 A1 | 3/2020 | Shapiro et al. |
| 2020/0089184 A1 | 3/2020 | Shapiro et al. |
| 2020/0089185 A1 | 3/2020 | Shapiro et al. |
| 2020/0125071 A1 | 4/2020 | Shapiro et al. |
| 2020/0150544 A1 | 5/2020 | Prochnau et al. |
| 2020/0192332 A1 | 6/2020 | Jacobs et al. |
| 2021/0007901 A1 | 1/2021 | Piantoni et al. |
| 2021/0066082 A1 | 3/2021 | Ito et al. |
| 2021/0094127 A1 | 4/2021 | Sercel et al. |
| 2021/0323071 A1 | 10/2021 | Mark |
| 2021/0354245 A1 | 11/2021 | Kang et al. |

FOREIGN PATENT DOCUMENTS

| | | |
|---|---|---|
| CN | 101283362 A | 10/2008 |
| CN | 201253852 Y | 6/2009 |
| CN | 101559513 A | 10/2009 |
| CN | 101733558 A | 6/2010 |
| CN | 101837517 A | 9/2010 |
| CN | 205958834 U | 2/2017 |
| CN | 106670656 A | 5/2017 |
| DE | 10 2014 214058 A1 | 1/2016 |
| EP | 0 050 425 A2 | 4/1982 |
| EP | 0 954 125 A2 | 11/1999 |
| EP | 1 309 108 A1 | 5/2003 |
| EP | 1 645 925 A1 | 4/2006 |
| EP | 2 471 625 A2 | 7/2012 |
| EP | 2 808 123 A1 | 12/2014 |
| FR | 2748562 A1 | 11/1997 |
| JP | H03-254380 A | 11/1991 |
| JP | 04-244347 A | 9/1992 |
| JP | H05-205051 A | 8/1993 |
| JP | H06-196557 A | 7/1994 |
| JP | 2001-330413 A | 11/2001 |
| JP | 2002-123306 A | 4/2002 |
| JP | 2006-187782 A | 7/2006 |
| JP | 2006-329751 A | 12/2006 |
| JP | 2008-119718 A | 5/2008 |
| JP | 4311856 B2 | 8/2009 |
| WO | WO-94/03302 A1 | 2/1994 |
| WO | WO-96/23240 A1 | 8/1996 |
| WO | WO-01/076250 A1 | 10/2001 |
| WO | WO-2016/131019 A1 | 8/2016 |
| WO | WO-2016/131022 A1 | 8/2016 |

OTHER PUBLICATIONS

Dazhong Wu et al. "Cloud Manufacturing: Drivers, Current Status, and Future Trends." vol. 2. Systems; Micro and Nano Technologies Sustainable Manufacturing. Jun. 10, 2013. Retrieved on May 10, 2016. pp. 1-10.
Examination Report issued in European Patent Application No. 16709185.9, dated Jan. 7, 2020 (Jul. 1, 2020). 5 pages.
Extended European Search Report issued in European Patent Application No. 21180624.5, dated Oct. 7, 2021 (Oct. 7, 2021). 13 pages.
Extended European Search Report issued in European Patent Application No. 21182408.1, dated Oct. 8, 2021 (Oct. 8, 2021). 14 pages.
First Office Action issued in Chinese Patent Application No. 201680021337.8, issue date Apr. 10, 2019. 6 pages. [Chinese language].
First Office Action issued in Chinese Patent Application No. 201680021337.8, dated Apr. 10, 2019. 8 pages. [English language translation].
First Office Action issued in Chinese Patent Application No. 201780084613.X, dated Sep. 9, 2021. 11 pages. [Chinese language].
First Office Action issued in Chinese Patent Application No. 201780084613.X, dated Sep. 9, 2021. 21 pages. [English language translation].
Gao, Rong et al. "Human-Machine Collaborative Workshop Digital Manufacturing." *ICICTA. 2010 IEEE.* May 11, 2010. pp. 445-448.
Hartmann, M. et al. (Feb. 27, 2014) "CutCAD User Guide", 71 pages. XP055844537, Retrieved from the Internet: URL:https://hci.rwth-aachen.de/index.php?option=com_attachments&task-download&id=2059 [retrieved on Sep. 24, 2021].

(56) References Cited

OTHER PUBLICATIONS

Hattuniemi, J.M. et al. (2009). "A calibration method of triangulation sensors for thickness measurement." 2009 IEEE Instrumentation and Measurement Technology Conference, (I2MTC) May 5-7, 2009 Singapore, Singapore, IEEE, Picataway, NJ, USA, 566-569. XP031492700, ISBN: 978-1-4244-3352-0.
Inmagine Group. Vectr Free Online Vector Graphics Software. Retrieved Mar. 22, 2021, from https://vectr.com/. 3 pages.
International Search Report and Written Opinion issued in International Application No. PCT/US2016/017900, dated May 27, 2016. 16 pages.
International Search Report and Written Opinion issued in International Application No. PCT/US2016/017901, dated Jun. 3, 2016 (Mar. 6, 2016). 13 pages.
International Search Report and Written Opinion issued in International Application No. PCT/US2016/017903, dated Jun. 1, 2016. 15 pages.
International Search Report and Written Opinion issued in International Application No. PCT/US2016/017904, dated May 23, 2016. (May 23, 2016). 19 pages.
International Search Report and Written Opinion issued in International Application No. PCT/US2017/063187, dated Apr. 3, 2018 (Mar. 4, 2018). 11 pages.
International Search Report and Written Opinion issued in International Application No. PCT/US2017/063188, dated Feb. 16, 2018 (Feb. 16, 2018). 14 pages.
International Search Report and Written Opinion issued in International Application No. PCT/US2017/063189, dated May 2, 2018 (Feb. 5, 2018). 22 pages.
International Search Report and Written Opinion issued in International Application No. PCT/US2017/063190, dated May 3, 2018 (Mar. 5, 2018). 18 pages.
International Search Report and Written Opinion issued in International Application No. PCT/US2017/063191, dated Mar. 21, 2018 (Mar. 21, 2018). 12 pages.
International Search Report and Written Opinion issued in International Application No. PCT/US2017/063192, dated Apr. 19, 2018 (Apr. 19, 2018). 12 pages.
International Search Report and Written Opinion issued in International Application No. PCT/US2017/063193, dated Feb. 16, 2018 (Feb. 16, 2018). 12 pages.
Office Action issued in European Patent Application No. 16709185.9, dated Oct. 27, 2021 (Oct. 27, 2021). 5 pages.
Robertson, D. et al. (Sep. 1991), "CAD and Cognitive Complexity: Beyond the Drafting Board Metaphor," Manufacturing Review, American Society of Mechanical Engineers, New York, US, vol. 4, No. 3, pp. 194-204, XP000233200,ISSN: 0896-1611.
Sass, L. (2007), "Synthesis of design production with integrated digital fabrication", Automation in Construction, Elsevier, Amsterdam, NL, vol. 16, No. 3, Feb. 7, 2007, pp. 298-310, XP005877992,ISSN: 0926-5805, Doi: 10.1016/J.AUTCON.2006.06.002.
Second Office Action issued in Chinese Patent Application No. 201680021337.8, dated Nov. 4, 2019. 3 pages. [Chinese language].
Second Office Action issued in Chinese Patent Application No. 201680021337.8, dated Nov. 4, 2019. 4 pages. [English language translation].
Sliwinski, P. et al. (2013). "A Simple Model for On-Sensor Phase-Detection Autofocusing Algorithm." Journal of Computer and Communications, vol. 1, No. 6, pp. 11-17. doi: 10.4236/jcc.2013.16003, ISSN: 2327-5219.
Third Office Action issued in Chinese Patent Application No. 201680021337.8, dated Jul. 23, 2020. 11 pages. [Chinese language].
Third Office Action issued in Chinese Patent Application No. 201680021337.8, dated Jul. 23, 2020. 20 pages. [English language translation].

\* cited by examiner

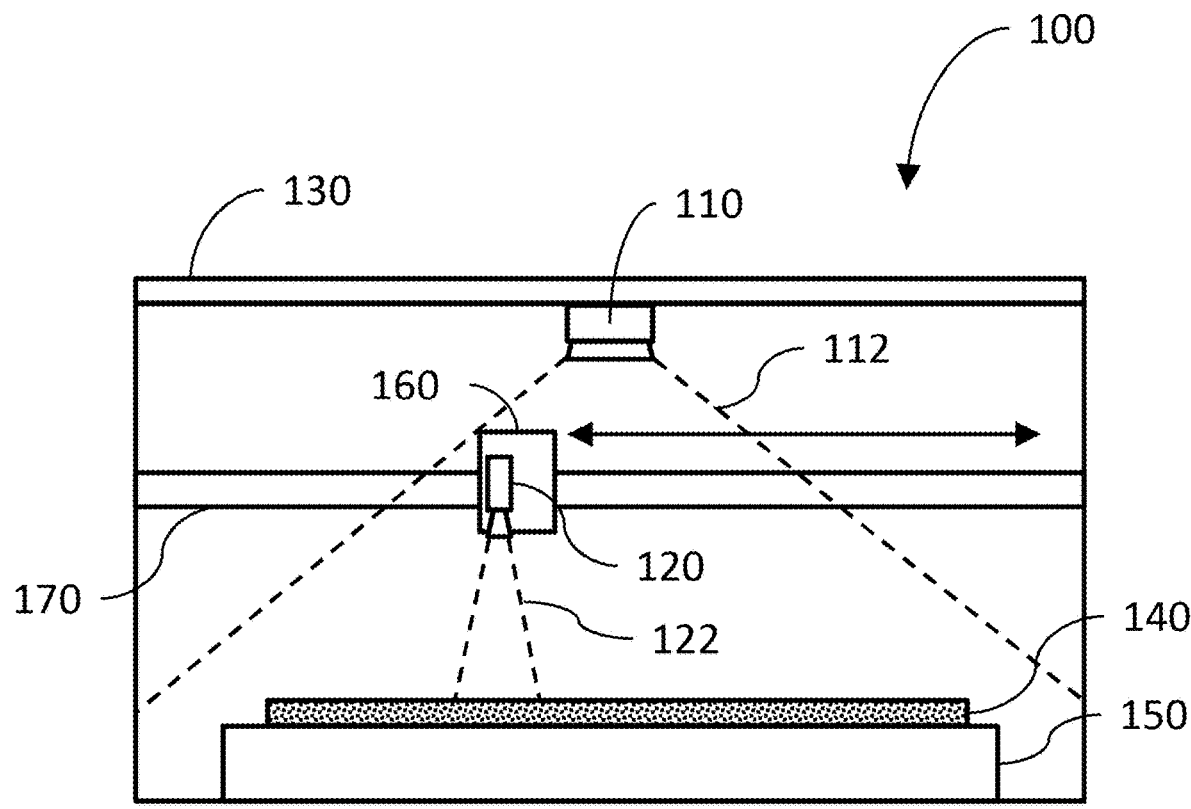
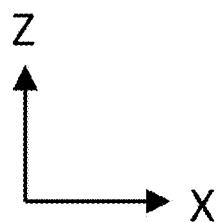
Fig. 1

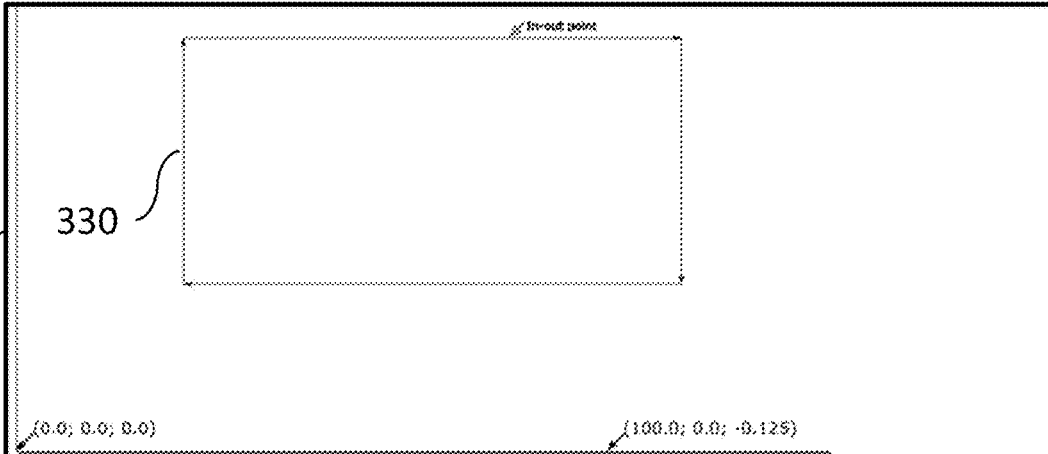

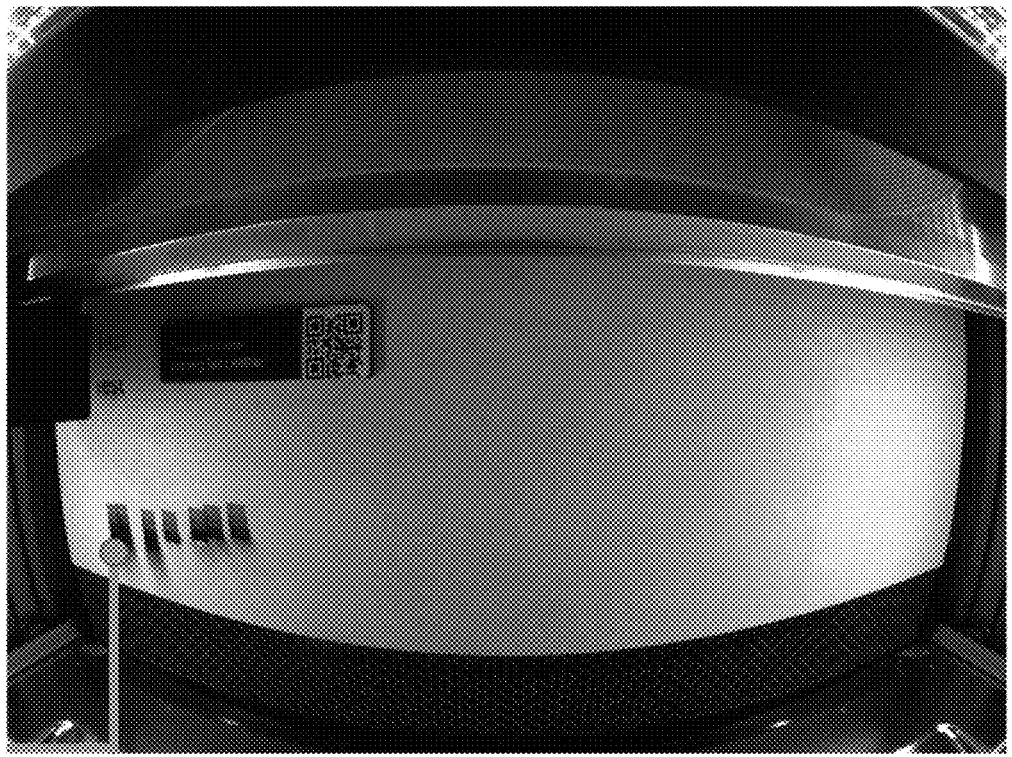
Location 300 pixels over, 600 pixels up
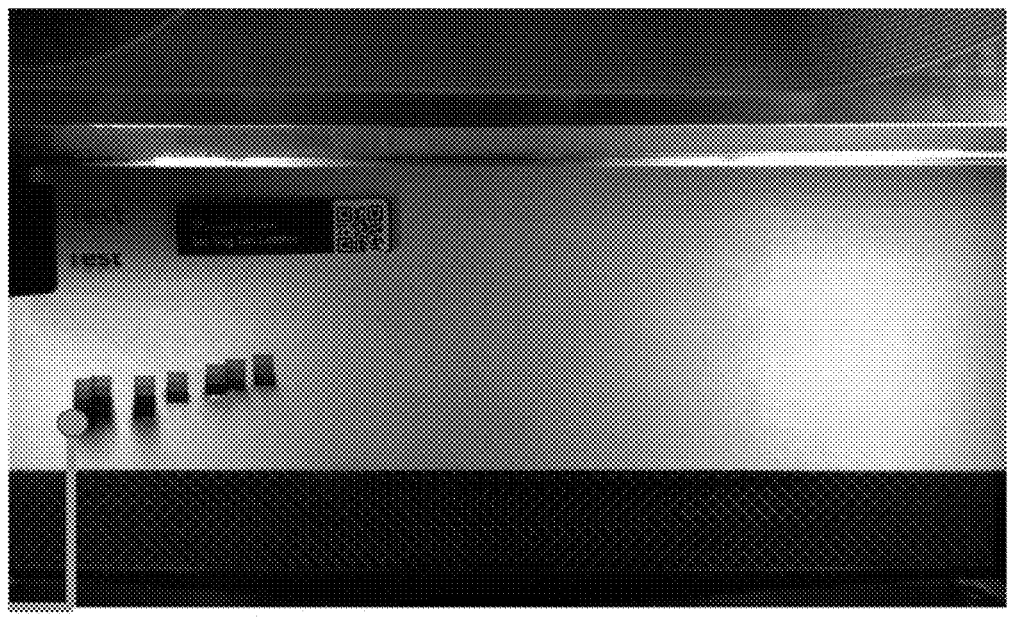
Location 1 inch over, 4 inches up
Fig. 6

CALIBRATION OF A COMPUTER-NUMERICALLY-CONTROLLED MACHINE

CROSS REFERENCE TO RELATED APPLICATION

This application is a continuation of U.S. patent application Ser. No. 15/823,511 filed on Nov. 27, 2017, entitled "CALIBRATION OF A COMPUTER-NUMERICALLY-CONTROLLED MACHINE," which claims priority to U.S. Provisional Application No. 62/426,437 filed on Nov. 25, 2016, entitled CALIBRATION OF OPTICAL AND MECHANICAL SYSTEMS ON A CNC MACHINE, the disclosures of which are incorporated herein by reference in their entirety.

TECHNICAL FIELD

The subject matter described herein relates to calibrating a computer-numerically-controlled machine based on images or other sensor data acquired from the computer-numerically-controlled machine.

BACKGROUND

A computer-numerically-controlled (CNC) machine can operate by moving a tool (e.g., a laser, drill bit, and/or the like) over a material to be machined, thereby creating one or more objects. The orientation of the optical and/or mechanical systems within the CNC machine can determine the output quality of the CNC machine including, for example, the precision and/or complexity of the details within the objects.

SUMMARY

In one aspect, a method includes capturing an image of at least a portion of a computer-numerically-controlled (CNC) machine with at least one camera located inside an enclosure that contains a material bed. A mapping relationship is created that maps a pixel in the image to a location. The creating includes compensating for a difference in the image relative to one or more physical parameters of the CNC machine and/or a material positioned on the material bed.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages, such as for example accurately mapping the details of an image, including commands based on positions in the image, to a real-space coordinate in the CNC machine. This can enable complex machine instructions to be executed in terms of spatial coordinates, command times, types of commands, etc. from information based on 2-D images.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to calibration of optical and mechanical systems on a CNC machine, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 is an elevational view of a computer-numerically-controlled (CNC) machine with a camera positioned to capture an image of the entire material bed and another camera positioned to capture an image of a portion of the material bed, consistent with some implementations of the current subject matter;

FIG. 3A is a diagram illustrating one example of an SVG source file, consistent with some implementations of the current subject matter;

FIG. 3B is an example of a graphical representation of the cut path in the CNC machine, consistent with some implementations of the current subject matter;

FIG. 3C is a diagram illustrating the machine file corresponding to the cut path and the source file, consistent with some implementations of the current subject matter;

FIG. 6 is a diagram illustrating a mapping between a pixel in an image and the equivalent point in a CNC machine, consistent with some implementations of the current subject matter;

When practical, similar reference numbers denote similar structures, features, or elements.

DETAILED DESCRIPTION

Figure 2:
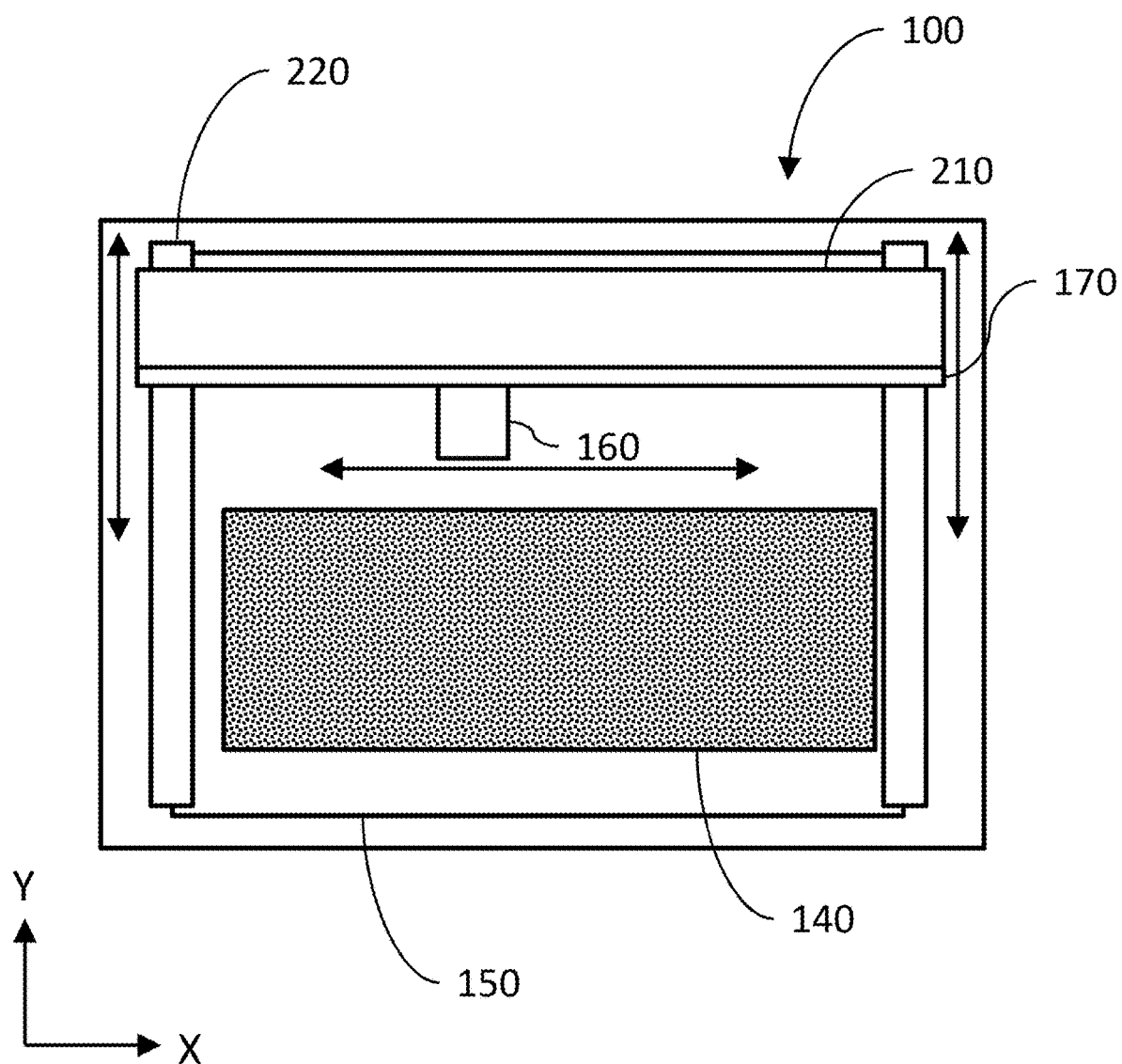
FIG. 2 is a top view of the implementation of the CNC machine shown in FIG. 1.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to using machine-vision for aiding automated manufacturing processes (e.g. a CNC process), it should be readily understood that such features are not intended to be limiting.

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a CNC machine modifies the appearance of the material without fully penetrating it. For example, in the context of a laser cutter, it can mean removing some of the material from the surface, or discoloring the material e.g. through an application of focused electromagnetic radiation delivering electromagnetic energy as described below.

As used herein, the term "laser" includes any electromagnetic radiation or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared radiation far from the visible spectrum such as microwaves, X-rays, or gamma rays, optically filtered detectors, spectrometers, and other detectors that can include sources providing electromagnetic radiation for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the CNC machine. For example, if the CNC machine is a laser cutter, lathe, or milling machine, the material is what is placed in the CNC machine to be cut, for example, the raw materials, stock, or the like. In another example, if the CNC machine is a 3-D printer, then the material is either the current layer, or previously existent layers or substrate, of an object being crafted by the 3-D printing process. In yet another example, if the CNC machine is a printer, then the material can be the paper onto which the CNC machine deposits ink.

INTRODUCTION

A computer-numerically-controlled (CNC) machine is a machine that is used to add or remove material under the control of a computer. There can be one or more motors or other actuators that move one or more heads that perform the adding or removing of material. For CNC machines that add material, heads can incorporate nozzles that spray or release polymers as in a typical 3D printer. In some implementations, the heads can include an ink source such as a cartridge or pen. In the case of 3-D printing, material can be built up layer by layer until a fully realized 3D object has been created. In some implementations, the CNC machine can scan the surface of a material such as a solid, a liquid, or a powder, with a laser to harden or otherwise change the material properties of said material. New material may be deposited. The process can be repeated to build successive layers. For CNC machines that remove material, the heads can incorporate tools such as blades on a lathe, drag knives, plasma cutters, water jets, bits for a milling machine, a laser for a laser cutter/engraver, etc.

FIG. 1 is an elevational view of a CNC machine 100 with a camera positioned to capture an image of an entire material bed 150 and another camera positioned to capture an image of a portion of the material bed 150, consistent with some implementations of the current subject matter. FIG. 2 is a top view of the implementation of the CNC machine 100 shown in FIG. 1.

The CNC machine 100 shown in FIG. 1 corresponds to one implementation of a laser cutter. While some features are described in the context of a laser cutter, this is by no means intended to be limiting. Many of the features described below can be implemented with other types of CNC machines. The CNC machine 100 can be, for example, a lathe, engraver, 3D-printer, milling machine, drill press, saw, etc.

While laser cutter/engravers share some common features with CNC machines, they have many differences and present particularly challenging design constraints. A laser cutter/ engraver is subject to regulatory guidelines that restrict the egress of electromagnetic radiation from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself. Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine for example fouling optical systems. The air exhausted from the machine may contain undesirable byproducts such as smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object. Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being affected, and air or other gasses may be used to aid the cutting process in a different manner, by facilitating combustion or clearing debris, for example.

The CNC machine 100 can have a housing surrounding an enclosure or interior area defined by the housing. The housing can include walls, a bottom, and one or more openings to allow access to the CNC machine 100, etc. There can be a material bed 150 that can include a top surface on which the material 140 generally rests.

In the implementation of FIG. 1, the CNC machine can also include an openable barrier as part of the housing to allow access between an exterior of the CNC machine and an interior space of the CNC machine. The openable barrier can include, for example, one or more doors, hatches, flaps, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure. Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the CNC machine 100. These access points can be for access to power, air, water, data, etc. Any of these access points can be monitored by cameras, position sensors, switches, etc. If they are accessed unexpectedly, the CNC machine 100 can execute actions to maintain the safety of the user and the system, for example, a controlled shutdown. In other implementations, the CNC machine 100 can be completely open (i.e. not having a lid 130, or walls). Any of the features described herein can also be present in an open configuration, where applicable.

As described above, the CNC machine 100 can have one or more movable heads that can be operated to alter the material 140. In some implementations, for example the implementation of FIG. 1, the movable head can be the head 160. There may be multiple movable heads, for example two or more mirrors that separately translate or rotate in able to locate a laser beam, or multiple movable heads that operate independently, for example two mill bits in a CNC machine capable of separate operation, or any combination thereof. In the case of a laser-cutter CNC machine, the head 160 can include optical components, mirrors, cameras, and other electronic components used to perform the desired machining operations. Again, as used herein, the head 160 typically is a laser-cutting head, but can be a movable head of any type.

The head 160, in some implementations, can be configured to include a combination of optics, electronics, and mechanical systems that can, in response to commands, cause a laser beam or electromagnetic radiation to be delivered to cut or engrave the material 140. The CNC machine 100 can also execute operation of a motion plan for causing movement of the movable head. As the movable head moves, the movable head can deliver electromagnetic energy to effect a change in the material 140 that is at least partially contained within the interior space. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head can be linear, for example on an X axis, a Y axis, or a Z axis. In other implementations, the head can combine motions along any combination of directions in a rectilinear, cylindrical, or spherical coordinate system.

A working area for the CNC machine 100 can be defined by the limits within which the movable head can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the CNC machine, that 400 in2 volume can be considered to be the working area. Restated, the working area can be defined by the extents of positions in which material 140 can be worked by the CNC machine 100, and not necessarily tied or limited by the travel of any one component. For example, if the head 160 could turn at an angle, then the working area could extend in some direction beyond the travel of the head 160. By this definition, the working area can also include any surface, or portion thereof, of any material 140 placed in the CNC machine 100 that is at least partially within the working area, if that surface can be worked by the CNC machine 100. Similarly, for oversized material, which may extend even outside the CNC machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the CNC machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the CNC machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the CNC machine 100 while an openable barrier, for example the lid 130, is in the open state (e.g. not in a closed state). The reverse can be true as well, meaning that some functions of the CNC machine 100 can be prevented while in a closed state. There can also be interlocks in series where, for example, the CNC machine 100 will not operate unless both the lid 130 and the front door are both closed. Furthermore, some components of the CNC machine 100 can be tied to states of other components of the CNC machine, such as not allowing the lid 130 to open while the laser is on, a movable component moving, a motor running, sensors detecting a certain gas, etc. In some implementations, the interlock can prevent emission of electromagnetic energy from the movable head when detecting that the openable barrier is not in the closed position.

Converting Source Files to Motion Plans

A traditional CNC machine accepts a user drawing, acting as a source file that describes the object the user wants to create or the cuts that a user wishes to make. Examples of source files are:

1) .STL files that define a three-dimensional object that can be fabricated with a 3D printer or carved with a milling machine, 2) .SVG files that define a set of vector shapes that can be used to cut or draw on material, 3) .JPG files that define a bitmap that can be engraved on a surface, and 4) CAD files or other drawing files that can be interpreted to describe the object or operations similarly to any of the examples above.

FIG. 3A is a diagram illustrating one example of an SVG source file 310, consistent with some implementations of the current subject matter. FIG. 3B is an example of a graphical representation 320 of the cut path 330 in the CNC machine, consistent with some implementations of the current subject matter. FIG. 3C is a diagram illustrating the machine file 340 that would result in a machine creating the cut path 330, created from the source file 310, consistent with some implementations of the current subject matter. The example source file 310 represents a work surface that is 640×480 units with a 300×150 unit rectangle whose top left corner is located 100 units to the right and 100 units down from the top-left corner of the work surface. A computer program can then convert the source file 310 into a machine file 340 that can be interpreted by the CNC machine 100 to take the actions illustrated in FIG. 3B. The conversion can take place on a local computer where the source files reside on the CNC machine 100, etc.

The machine file 340 describes the idealized motion of the CNC machine 100 to achieve the desired outcome. Take, for example, a 3D printer that deposits a tube-shaped string of plastic material. If the source file specifies a rectangle then the machine file can instruct the CNC machine to move along a snakelike path that forms a filled in rectangle, while extruding plastic. The machine file can omit some information, as well. For example, the height of the rectangle may no longer be directly present in the machine file; the height will be as tall as the plastic tube is high. The machine file can also add some information. For example, the instruction to move the print head from its home position to a corner of the rectangle to begin printing. The instructions can even depart from the directly expressed intent of the user. A common setting in 3D printers, for example, causes solid shapes to be rendered as hollow in the machine file to save on material cost.

As shown by the example of FIGS. 3A-C, the conversion of the source file 310 to the machine file 330 can cause the CNC machine to move the cutting tool from (0,0) (in FIG. 3B) to the point at which cutting is to begin, activate the cutting tool (for example lower a drag knife or energize a laser), trace the rectangle, deactivate the cutting tool, and return to (0,0).

Once the machine file has been created, a motion plan for the CNC machine 100 can be generated. The motion plan contains the data that determines the actions of components of the CNC machine 100 at different points in time. The motion plan can be generated on the CNC machine 100 itself or by another computing system. A motion plan can be a stream of data that describes, for example, electrical pulses that indicate exactly how motors should turn, a voltage that indicates the desired output power of a laser, a pulse train that specifies the rotational speed of a mill bit, etc. Unlike the source files and the machine files such as G-code, motion plans are defined by the presence of a temporal element, either explicit or inferred, indicating the time or time offset at which each action should occur. This allows for one of the key functions of a motion plan, coordinated motion, wherein multiple actuators coordinate to have a single, pre-planned effect.

The motion plan renders the abstract, idealized machine file as a practical series of electrical and mechanical tasks. For example, a machine file might include the instruction to "move one inch to the right at a speed of one inch per second, while maintaining a constant number of revolutions per second of a cutting tool." The motion plan must take into consideration that the motors cannot accelerate instantly, and instead must "spin up" at the start of motion and "spin down" at the end of motion. The motion plan would then specify pulses (e.g. sent to stepper motors or other apparatus for moving the head or other parts of a CNC machine) occurring slowly at first, then faster, then more slowly again near the end of the motion.

The machine file is converted to the motion plan by the motion controller/planner. Physically, the motion controller can be a general or special purpose computing device, such as a high performance microcontroller or single board computer coupled to a Digital Signal Processor (DSP). The job of the motion controller is to take the vector machine code and convert it into electrical signals that will be used to drive the motors on the CNC machine 100, taking in to account the exact state of the CNC machine 100 at that moment (e.g. "since the machine is not yet moving, maximum torque must be applied, and the resulting change in speed will be small") and physical limitations of the machine (e.g. accelerate to such-and-such speed, without generating forces in excess of those allowed by the machine's design). The signals can be step and direction pulses fed to stepper motors or location signals fed to servomotors among other possibilities, which create the motion and actions of the CNC machine 100, including the operation of elements like actuation of the head 160, moderation of heating and cooling, and other operations. In some implementations, a compressed file of electrical signals can be decompressed and then directly output to the motors. These electrical signals can include binary instructions similar to 1's and 0's to indicate the electrical power that is applied to each input of each motor over time to effect the desired motion.

In the most common implementation, the motion plan is the only stage that understands the detailed physics of the CNC machine 100 itself, and translates the idealized machine file into implementable steps. For example, a particular CNC machine 100 might have a heavier head, and require more gradual acceleration. This limitation is modeled in the motion planner and affects the motion plan. Each model of CNC machine can require precise tuning of the motion plan based on its measured attributes (e.g. motor torque) and observed behavior (e.g. belt skips when accelerating too quickly). The CNC machine 100 can also tune the motion plan on a per-machine basis to account for variations from CNC machine to CNC machine.

The motion plan can be generated and fed to the output devices in real-time, or nearly so. The motion plan can also be pre-computed and written to a file instead of streamed to a CNC machine, and then read back from the file and transmitted to the CNC machine 100 at a later time. Transmission of instructions to the CNC machine 100, for example, portions of the machine file or motion plan, can be streamed as a whole or in batches from the computing system storing the motion plan. Batches can be stored and managed separately, allowing pre-computation or additional optimization to be performed on only part of the motion plan. In some implementations, a file of electrical signals, which may be compressed to preserve space and decompressed to facilitate use, can be directly output to the motors. The electrical signals can include binary instructions similar to 1's and 0's to indicate actuation of the motor.

The motion plan can be augmented, either by precomputing in advance or updating in real-time, with the aid of machine vision. Machine vision is a general term that describes the use of sensor data, and not only limited to optical data, in order to provide additional input to machine operation. Other forms of input can include, for example, audio data from an on-board sound sensor such as a microphone, or position/acceleration/vibration data from an on-board sensor such as a gyroscope or accelerometer. Machine vision can be implemented by using cameras to provide images of, for example, the CNC machine 100, the material being operated on by the CNC machine, the environment of the CNC machine 100 (if there is debris accumulating or smoke present), or any combination of these. These cameras can then route their output to a computer for processing. By viewing the CNC machine 100 in operation and analyzing the image data it can, for example, be determined if the CNC machine 100 is working correctly, if the CNC machine 100 is performing optimally, the current status of the CNC machine 100 or subcomponents of the CNC machine 100, etc. Similarly, the material can be imaged and, for example, the operation of the CNC machine 100 can be adjusted according to instructions, users can be notified when the project is complete, or information about the material can be determined from the image data. Error conditions can be identified, such as if a foreign body has been inadvertently left in the CNC machine 100, the material has been inadequately secured, or the material is reacting in an unexpected way during machining.

Camera Systems

Cameras can be mounted inside the CNC machine 100 to acquire image data during operation of the CNC machine 100. Image data refers to all data gathered from a camera or image sensor, including still images, streams of images, video, audio, metadata such as shutter speed and aperture settings, settings or data from or pertaining to a flash or other auxiliary information, graphic overlays of data superimposed upon the image such as GPS coordinates, in any format, including but not limited to raw sensor data such as a .DNG file, processed image data such as a JPG file, and data resulting from the analysis of image data processed on the camera unit such as direction and velocity from an optical mouse sensor. For example, there can be cameras mounted such that they gather image data from (also referred to as 'view' or 'image') an interior portion of the CNC machine 100. The viewing can occur when the lid 130 is in a closed position or in an open position or independently of the position of the lid 130. In one implementation, one or more cameras, for example a camera mounted to the interior surface of the lid 130 or elsewhere within the case or enclosure, can view the interior portion when the lid 130 to the CNC machine 100 is a closed position. In particular, in some preferred embodiments, the cameras can image the material 140 while the CNC machine 100 is closed and, for example, while machining the material 140. In some implementations, cameras can be mounted within the interior space and opposite the working area. In other implementations, there can be a single camera or multiple cameras attached to the lid 130. Cameras can also be capable of motion such as translation to a plurality of positions, rotation, and/or tilting along one or more axes. One or more cameras mounted to a translatable support, such as a gantry 210, which can be any mechanical system that can be commanded to move (movement being understood to include rotation) the camera or a mechanism such as a mirror that can redirect the view of the camera, to different locations and view different regions of the CNC machine. The head 160 is a special case of the translatable support, where the head 160 is limited by the track 220 and the translation rail 170 that constrain its motion.

Lenses can be chosen for wide angle coverage, for extreme depth of field so that both near and far objects may be in focus, or many other considerations. The cameras may be placed to additionally capture the user so as to document the building process, or placed in a location where the user can move the camera, for example on the underside of the lid 130 where opening the CNC machine 100 causes the camera to point at the user. Here, for example, the single camera described above can take an image when the lid is not in the closed position. Such an image can include an object, such as a user, that is outside the CNC machine 100. Cameras can be mounted on movable locations like the head 160 or lid 130 with the intention of using video or multiple still images taken while the camera is moving to assemble a larger image, for example scanning the camera across the material 140 to get an image of the material 140 in its totality so that the analysis of image data may span more than one image.

As shown in FIG. 1, a lid camera 110, or multiple lid cameras, can be mounted to the lid 130. In particular, as shown in FIG. 1, the lid camera 110 can be mounted to the underside of the lid 130. The lid camera 110 can be a camera with a wide field of view 112 that can image a first portion of the material 140. This can include a large fraction of the material 140 and the material bed or even all of the material 140 and material bed 150. The lid camera 110 can also image the position of the head 160, if the head 160 is within the field of view of the lid camera 110. Mounting the lid camera 110 on the underside of the lid 130 allows for the user to be in view when the lid 130 is open. This can, for example, provide images of the user loading or unloading the material 140, or retrieving a finished project. Here, a number of sub-images, possibly acquired at a number of different locations, can be assembled, potentially along with other data like a source file such as an SVG or digitally rendered text, to provide a final image. When the lid 130 is closed, the lid camera 110 rotates down with the lid 130 and brings the material 140 into view.

Also as shown in FIG. 1, a head camera 120 can be mounted to the head 160. The head camera 120 can have a narrower field of view 122 and take higher resolution images of a smaller area, of the material 140 and the material bed, than the lid camera 110. One use of the head camera 120 can be to image the cut made in the material 140. The head camera 120 can identify the location of the material 140 more precisely than possible with the lid camera 110.

Other locations for cameras can include, for example, on an optical system guiding a laser for laser cutting, on the laser itself, inside a housing surrounding the head 160, underneath or inside of the material bed 150, in an air filter or associated ducting, etc. Cameras can also be mounted outside the CNC machine 100 to view users or view external features of the CNC machine 100.

Multiple cameras can also work in concert to provide a view of an object or material 140 from multiple locations, angles, resolutions, etc. For example, the lid camera 110 can identify the approximate location of a feature in the CNC machine 100. The CNC machine 100 can then instruct the head 160 to move to that location so that the head camera 120 can image the feature in more detail.

While the examples herein are primarily drawn to a laser cutter, the use of the cameras for machine vision in this application is not limited to only that specific type of CNC machine 100. For example, if the CNC machine 100 were a lathe, the lid camera 110 can be mounted nearby to view the rotating material 140 and the head 160, and the head camera 120 located near the cutting tool. Similarly, if the CNC machine 100 were a 3D printer, the head camera 120 can be mounted on the head 160 that deposits material 140 for forming the desired piece.

An image recognition program can identify conditions in the interior portion of the CNC machine 100 from the acquired image data. The conditions that can be identified are described at length below, but can include positions and properties of the material 140, the positions of components of the CNC machine 100, errors in operation, etc. Based in part on the acquired image data, instructions for the CNC machine 100 can be created or updated. The instructions can, for example, act to counteract or mitigate an undesirable condition identified from the image data. The instructions can include changing the output of the head 160. For example, for a CNC machine 100 that is a laser cutter, the laser can be instructed to reduce or increase power or turn off. Also, the updated instructions can include different parameters for motion plan calculation, or making changes to an existing motion plan, which could change the motion of the head 160 or the gantry 210. For example, if the image indicates that a recent cut was offset from its desired location by a certain amount, for example due to a part moving out of alignment, the motion plan can be calculated with an equal and opposite offset to counteract the problem, for example for a second subsequent operation or for all future operations. The CNC machine 100 can execute the instructions to create the motion plan or otherwise effect the changes described above. In some implementations, the movable component can be the gantry 210, the head 160, or an identifiable mark on the head 160. The movable component, for example the gantry 210, can have a fixed spatial relationship to the movable head. The image data can update software controlling operation of the CNC machine 100 with a position of the movable head and/or the movable component with their position and/or any higher order derivative thereof.

Because the type of image data required can vary, and/or because of possible limitations as to the field of view of any individual camera, multiple cameras can be placed throughout the CNC machine 100 to provide the needed image data. Camera choice and placement can be optimized for many use cases. Cameras closer to the material 140 can be used for detail at the expense of a wide field of view. Multiple cameras may be placed adjacently so that images produced by the multiple cameras can be analyzed by the computer to achieve higher resolution or wider coverage jointly than was possible for any image individually. The manipulation and improvement of images can include, for example, stitching of images to create a larger image, adding images to increase brightness, differencing images to isolate changes (such as moving objects or changing lighting), multiplying or dividing images, averaging images, rotating images, scaling images, sharpening images, and so on, in any combination. Further, the system may record additional data to assist in the manipulation and improvement of images, such as recordings from ambient light sensors and location of movable components. Specifically, stitching can include taking one or more sub-images from one or more cameras and combining them to form a larger image. Some portions of the images can overlap as a result of the stitching process. Other images may need to be rotated, trimmed, or otherwise manipulated to provide a consistent and seamless larger image as a result of the stitching. Lighting artifacts such as glare, reflection, and the like, can be reduced or eliminated by any of the above methods. Also, the image analysis program can performing edge detection and noise reduction or elimination on the acquired images. Edge detection can include performing contrast comparisons of different parts of the image to detect edges and identify objects or features in the image. Noise reduction can involve averaging or smoothing of one or more images to reduce the contribution of periodic, random, or pseudo-random image noise, for example that due to CNC machine 100 operation such as vibrating fans, motors, etc.

Figure 4A:
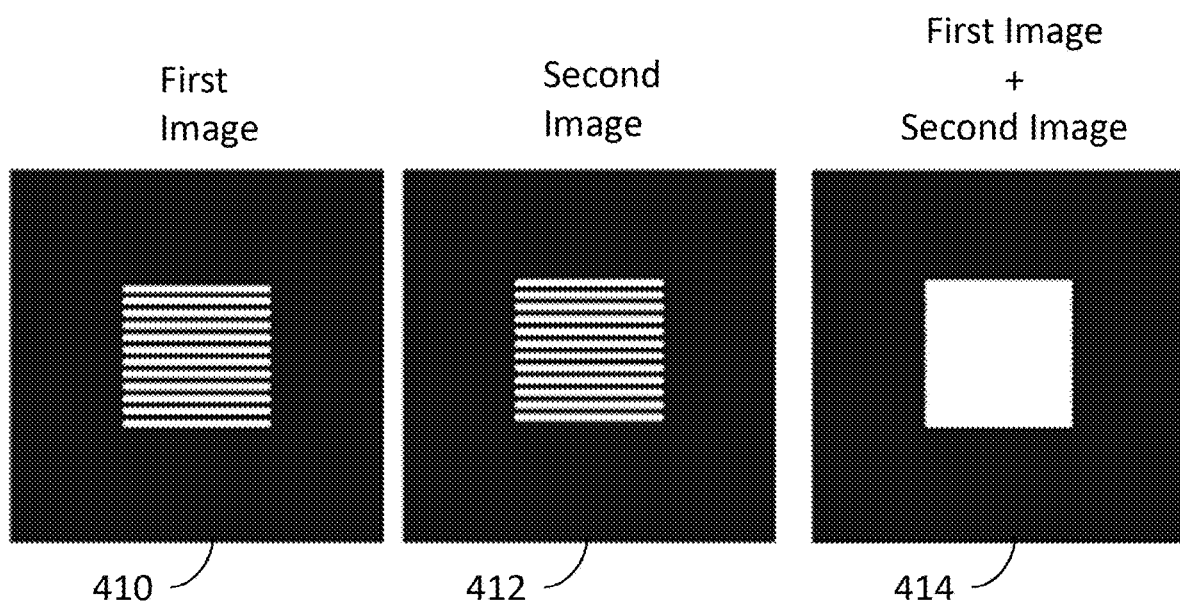
FIG. 4A is a diagram illustrating the addition of images, consistent with some implementations of the current subject matter.

FIG. 4A is a diagram illustrating the addition of images, consistent with some implementations of the current subject matter. Images taken by the cameras can be added, for example, to increase the brightness of an image. In the example of FIG. 4A, there is a first image 410, a second image 412, and a third image 414. First image 410 has horizontal bands (shown in white against a black background in the figure). The horizontal bands can conform to a more brightly lit object, though the main point is that there is a difference between the bands and the background. Second image 412 has similar horizontal bands, but offset in the vertical direction relative to those in the first image 410. When the first image 410 and second image 412 are added, their sum is shown in by the third image 414. Here, the two sets of bands interleave to fill in the bright square as shown. This technique can be applied to, for example, acquiring many image frames from the cameras, possibly in low light conditions, and adding them together to form a brighter image.

Figure 4B:
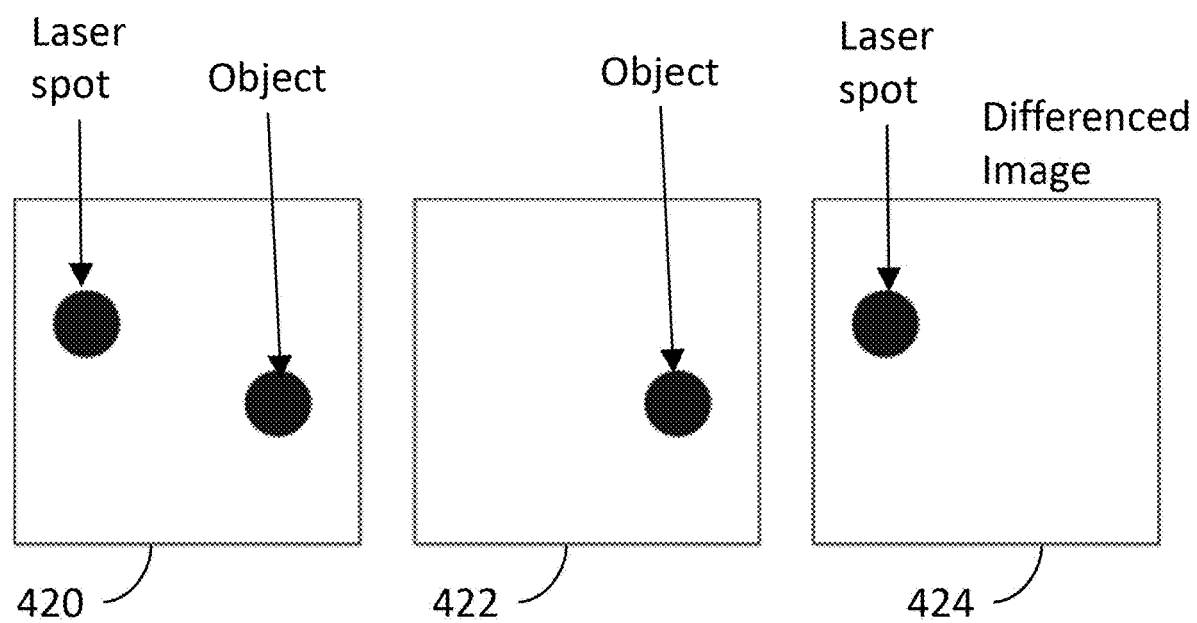
FIG. 4B is a diagram illustrating the subtraction of images, consistent with some implementations of the current subject matter.

FIG. 4B is a diagram illustrating the subtraction of images, consistent with some implementations of the current subject matter. Image subtraction can be useful to, for example, isolate dim laser spot from a comparatively bright image. Here, a first image 420 shows two spots, one representative of a laser spot and the other of an object. To isolate the laser spot, a second image 422 can be taken with the laser off, leaving only the object. Then, the second image 422 can be subtracted from the first image 420 to arrive at the third image 424. The remaining spot in the third image 424 is the laser spot.

Figure 4C:
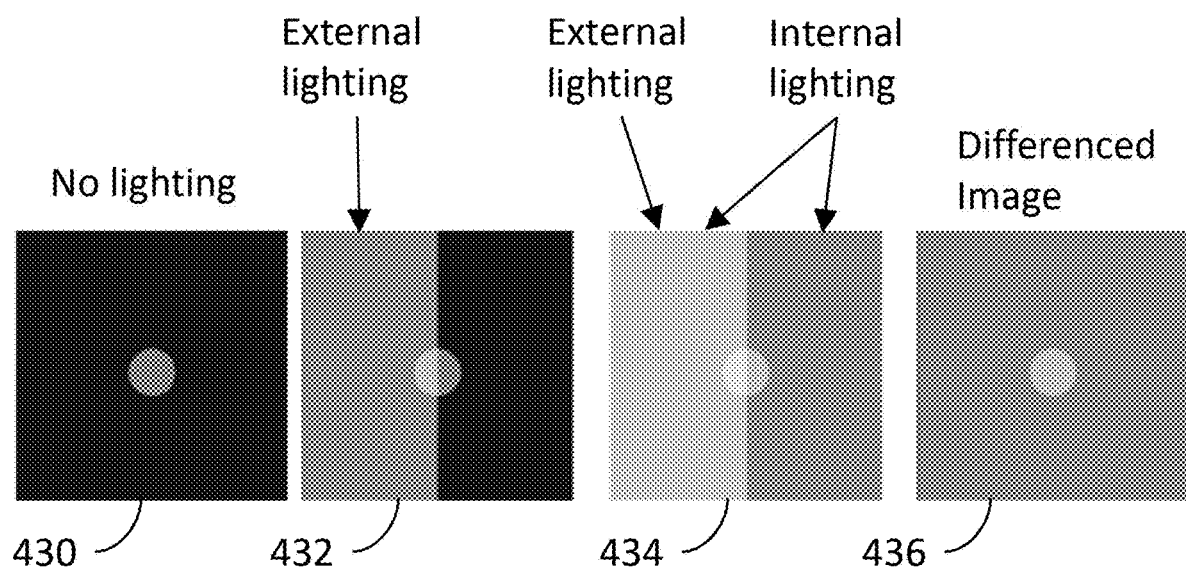
FIG. 4C is a diagram illustrating the differencing of images to isolate a simulated internal lighting effect, consistent with some implementations of the current subject matter.

FIG. 4C is a diagram illustrating the differencing of images to isolate a simulated internal lighting effect, consistent with some implementations of the current subject matter. There can be an object in the CNC machine 100, represented as a circle in first image 430. This could represent, for example an object on the material bed 150 of the CNC machine 100. If, for example, half of the material bed 150 of the CNC machine 100 was illumined by outside lighting, such as a sunbeam, the second image 420 might appear as shown, with the illuminated side brighter than the side without the illumination. It can sometimes be advantageous to use internal lighting during operation, for example to illuminate a watermark, aid in image diagnostics, or simply to better show a user what is happening in the CNC machine. Even if none of these reasons apply, however, internal lighting allows reduction or elimination of the external lighting (in this case the sunbeam) via this method. This internal lighting is represented in the third image 434 by adding a brightness layer to the entire second image 432. To isolate the effect of the internal lighting, the second image 432 can be subtracted from 434 to result in fourth image 436. Here, fourth image 436 shows the area, and the object, as it would appear under only internal lighting. This differencing can allow image analysis to be performed as if only the controlled internal lighting were present, even in the presence of external lighting contaminants.

Machine vision processing of images can occur at, for example, the CNC machine 100, on a locally connected computer, or on a remote server connected via the internet. In some implementations, image processing capability can be performed by the CNC machine 100, but with limited speed. One example of this can be where the onboard processor is slow and can run only simple algorithms in real-time, but which can run more complex analysis given more time. In such a case, the CNC machine 100 could pause for the analysis to be complete, or alternatively, execute the data on a faster connected computing system. A specific example can be where sophisticated recognition is performed remotely, for example, by a server on the internet. In these cases, limited image processing can be done locally, with more detailed image processing and analysis being done remotely. For example, the camera can use a simple algorithm, run on a processor in the CNC machine 100, to determine when the lid 130 is closed. Once the CNC machine 100 detects that the lid 130 is closed, the processor on the CNC machine 100 can send images to a remote server for more detailed processing, for example, to identify the location of the material 140 that was inserted. The system can also devote dedicated resources to analyzing the images locally, pause other actions, or diverting computing resources away from other activities.

In another implementation, the head 160 can be tracked by onboard, real-time analysis. For example, tracking the position of the head 160, a task normally performed by optical encoders or other specialized hardware, can be done with high resolution, low resolution, or a combination of both high and low resolution images taken by the cameras. As high-resolution images are captured, they can be transformed into lower resolution images that are smaller in memory size by resizing or cropping. If the images include video or a sequence of still images, some may be eliminated or cropped. A data processor can analyze the smaller images repeatedly, several times a second for example, to detect any gross misalignment. If a misalignment is detected, the data processor can halt all operation of the CNC machine 100 while more detailed processing more precisely locates exactly the head 160 using higher resolution images. Upon location of the head 160, the head 160 can be adjusted to recover the correction location. Alternatively, images can be uploaded to a server where further processing can be performed. The location can be determined by, for example, looking at the head 160 with the lid camera, by looking at what the head camera 120 is currently imaging, etc. For example, the head 160 could be instructed to move to a registration mark. Then the head camera 120 can then image the registration mark to detect any minute misalignment.

Basic Camera Functionality

The cameras can be, for example, a single wide-angle camera, multiple cameras, a moving camera where the images are digitally combined, etc. The cameras used to image a large region of the interior of the CNC machine 100 can be distinct from other cameras that image a more localized area. The head camera 160 can be one example of a camera that, in some implementations, images a smaller area than the wide-angle cameras.

There are other camera configurations that can be used for different purposes. A camera (or cameras) with broad field of view can cover the whole of the machine interior, or a predefined significant portion thereof. For example, the image data acquired from one or more of the cameras can include most (meaning over 50%) of the working area. In other embodiments, at least 60%, 70%, 80%, 90%, or 100% of the working area can be included in the image data. The above amounts do not take into account obstruction by the material 140 or any other intervening objects. For example, if a camera is capable of viewing 90% of the working area without material 140, and a piece of material 140 is placed in the working area, partially obscuring it, the camera is still considered to be providing image data that includes 90% of the working area. In some implementations, the image data can be acquired when the interlock is not preventing the emission of electromagnetic energy.

In other implementations, a camera mounted outside the machine can see users and/or material 140 entering or exiting the CNC machine 100, record the use of the CNC machine 100 for sharing or analysis, or detect safety problems such as an uncontrolled fire. Other cameras can provide a more precise look with limited field of view. Optical sensors like those used on optical mice can provide very low resolution and few colors, or greyscale, over a very small area with very high pixel density, then quickly process the information to detect material 140 moving relative to the optical sensor. The lower resolution and color depth, plus specialized computing power, allow very quick and precise operation. Conversely, if the head is static and the material is moved, for example if the user bumps it, this approach can see the movement of the material and characterize it very precisely so that additional operations on the material continue where the previous operations left off, for example resuming a cut that was interrupted before the material was moved.

Video cameras can detect changes over time, for example comparing frames to determine the rate at which the camera is moving. Still cameras can be used to capture higher resolution images that can provide greater detail. Yet another type of optical scanning can be to implement a linear optical sensor, such as a flatbed scanner, on an existing rail, like the sliding gantry 210 in a laser system, and then scan it over the material 140, assembling an image as it scans.

To isolate the light from the laser, the laser may be turned off and on again, and the difference between the two measurements indicates the light scattered from the laser while removing the effect of environmental light. The cameras can have fixed or adjustable sensitivity, allowing them to operate in dim or bright conditions. There can be any combination of cameras that are sensitive to different wavelengths. Some cameras, for example, can be sensitive to wavelengths corresponding to a cutting laser, a range-finding laser, a scanning laser, etc. Other cameras can be sensitive to wavelengths that specifically fall outside the wavelength of one or more lasers used in the CNC machine 100. The cameras can be sensitive to visible light only, or can have extended sensitivity into infrared or ultraviolet, for example to view invisible barcodes marked on the surface, discriminate between otherwise identical materials based on IR reflectivity, or view invisible (e.g. infrared) laser beams directly. The cameras can even be a single photodiode that measures e.g. the flash of the laser striking the material 140, or which reacts to light emissions that appear to correlate with an uncontrolled fire. The cameras can be used to image, for example, a beam spot on a mirror, light escaping an intended beam path, etc. The cameras can also detect scattered light, for example if a user is attempting to cut a reflective material. Other types of cameras can be implemented, for example, instead of detecting light of the same wavelength of the laser, instead detecting a secondary effect, such as infrared radiation (with a thermographic camera) or x-rays given off by contact between the laser and another material.

The cameras may be coordinated with lighting sources in the CNC machine 100. The lighting sources can be positioned anywhere in the CNC machine 100, for example, on the interior surface of the lid 130, the walls, the floor, the gantry 210, etc. One example of coordination between the lighting sources and the cameras can be to adjust internal LED illumination while acquiring images of the interior portion with the cameras. For example, if the camera is only capable of capturing images in black and white, the internal LEDs can illuminate sequentially in red, green, and blue, capturing three separate images. The resulting images can then be combined to create a full color RGB image. If external illumination is causing problems with shadows or external lighting effects, the internal lighting can be turned off while a picture is taken, then turned on while a second picture is taken. By subtracting the two on a pixel-by-pixel basis, ambient light can be cancelled out so that it can be determined what the image looks like when illuminated only by internal lights. If lighting is movable, for example on the translation arm of the CNC machine 100, it can be moved around while multiple pictures are taken, then combined, to achieve an image with more even lighting. The brightness of the internal lights can also be varied like the flash in a traditional camera to assist with illumination. The lighting can be moved to a location where it better illuminates an area of interest, for example so it shines straight down a slot formed by a cut, so a camera can see the bottom of the cut. If the internal lighting is interfering, it can be turned off while the camera takes an image. Optionally, the lighting can be turned off for such a brief period that the viewer does not notice (e.g. for less than a second, less than $\frac{1}{60}$th of a second, or less than $\frac{1}{120}$th of a second). Conversely, the internal lighting may be momentarily brightened like a camera flash to capture a picture. Specialized lights may be used and/or engaged only when needed; for example, an invisible but UV-fluorescent ink might be present on the material. When scanning for a barcode, UV illumination might be briefly flashed while a picture is captured so that any ink present would be illuminated. The same technique of altering the lighting conditions can be performed by toggling the range-finding and/or cutting lasers as well, to isolate their signature and/or effects when imaging. If the object (or camera) moves between acquisitions, then the images can be cropped, translated, expanded, rotated, and so on, to obtain images that share common features in order to allow subtraction. This differencing technique is preferably done with automatic adjustments in the cameras are overridden or disabled. For example, disabling autofocus, flashes, etc. Features that can ideally be held constant between images can include, for example, aperture, shutter speed, white balance, etc. In this way, the changes in the two images are due only to differences from the lighting and not due to adjustment in the optical system.

Multiple cameras, or a single camera moved to different locations in the CNC machine 100, can provide images from different angles to generate 3D representations of the surface of the material 140 or an object. The 3D representations can be used for generating 3D models, for measuring the depth that an engraving or laser operation produced, or providing feedback to the CNC machine 100 or a user during the manufacturing process. It can also be used for scanning, to build a model of the material 140 for replication.

The camera can be used to record photos and video that the user can use to share their progress. Automatic "making of" sequences can be created that stitch together various still and video images along with additional sound and imagery, for example the digital rendering of the source file or the user's picture from a social network. Knowledge of the motion plan, or even the control of the cameras via the motion plan directly, can enable a variety of optimizations. In one example, given a machine with two cameras, one of which is mounted in the head and one of which is mounted in the lid, the final video can be created with footage from the head camera at any time that the gantry is directed to a location that is known to obscure the lid camera. In another example, the cameras can be instructed to reduce their aperture size, reducing the amount of light let in, when the machine's internal lights are activated. In another example, if the machine is a laser cutter/engraver and activating the laser causes a camera located in the head to become overloaded and useless, footage from that camera may be discarded when it is unavailable. In another example, elements of the motion plan may be coordinated with the camera recording for optimal visual or audio effect, for example fading up the interior lights before the cut or driving the motors in a coordinated fashion to sweep the head camera across the material for a final view of the work result. In another example, sensor data collected by the system might be used to select camera images; for example, a still photo of the user might be captured from a camera mounted in the lid when an accelerometer, gyroscope, or other sensor in the lid detects that the lid has been opened and it has reached the optimal angle. In another example, recording of video might cease if an error condition is detected, such as the lid being opened unexpectedly during a machining operation. The video can be automatically edited using information like the total duration of the cut file to eliminate or speed up monotonous events; for example, if the laser must make 400 holes, then that section of the cut plan could be shown at high speed. Traditionally, these decisions must all be made by reviewing the final footage, with little or no a priori knowledge of what they contain. Pre-selecting the footage (and even coordinating its capture) can allow higher quality video and much less time spent editing it. Video and images from the production process can be automatically stitched together in a variety of fashions, including stop motion with images, interleaving video with stills, and combining video and photography with computer-generated imagery, e.g. a 3D or 2D model of the item being rendered. Video can also be enhanced with media from other sources, such as pictures taken with the user's camera of the final product.

Additional features that can be included individually, or in any combination, are described in the sections below.

Network Configuration

Figure 5:
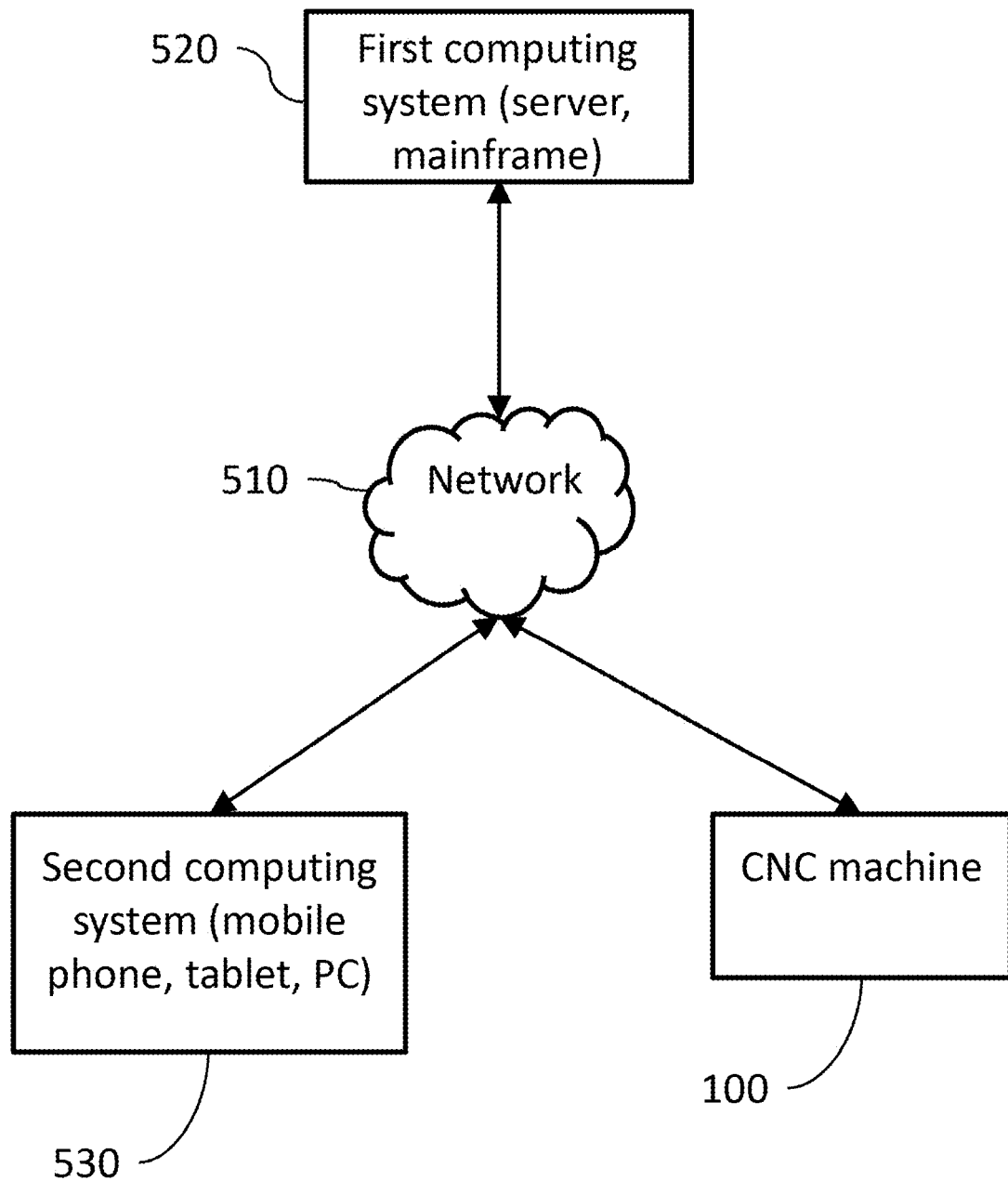
FIG. 5 is a diagram illustrating a cloud-based system supporting operation of a CNC machine, consistent with some implementations of the current subject matter.

FIG. 5 is a diagram illustrating a cloud-based system supporting operation of a CNC machine 100, consistent with some implementations of the current subject matter. By taking the most computationally expensive steps in the process described herein and distributing them over a network 510 to distributed computers, several advantages can be realized. The cloud-based system can include any number or combinations of first computing systems 520 (servers, mainframes, etc.) to provide powerful computation services. There can also be smaller second computing systems 530, for example, mobile phones, tablet computers, personal computers, etc. where users can access and interact with the system. Both the first computing system 520 and the second computing system 530 can be connected by the network 510 to each other and to any number of CNC machines. The network 510 can be a wired or wireless network.

Calibration Between Camera Images And Machine Coordinates

FIG. 6 is a diagram illustrating a mapping between a pixel in an image and the equivalent point in a CNC machine, consistent with some implementations of the current subject matter. Optical systems such as cameras provide greater utility when their output is correlated with other values such as known physical references. This can occur by a process of one-time, repeated, or continual calibration, in which, for example, measurements of known quantities can be made by optical systems and any deviation of the measured value from the known value can be recorded and used to compensate for future deviations. For this reason, correct optical calibration is crucial to CNC machine function and performance. Optical calibration by processes such as head homing can be part of factory set-up, system resets, and responses to observed alignment errors that may otherwise occur. The premise of one example of this approach is to use optical measurements to leverage relationships between features with known system geometry in order to calculate unknowns of interest.

As described herein, there can be one or more cameras located throughout the interior of the CNC machine. These cameras can generate images according to their individual configuration. For example, the cameras can be oriented at varying angles relative to the material bed, contain optical components that transform or distort the images acquired with the cameras, and so on, with any or all of these affecting the final image. A mapping may be created by which a pixel in the image is determined to correspond to one or more locations in the CNC machine. As shown in FIG. 6, a pixel can conform to a particular spot on the material bed.

In some implementations of the current subject matter, an image of a fixture and/or calibration tool that is not necessarily part of the CNC machine may be captured with at least one camera located within an enclosure that also contains the fixture and/or the calibration tool. A mapping relationship can be applied to map between a pixel in the image to CNC machine coordinates. As used herein, CNC machine coordinates can refer to a location at which the tool can process material within the working area of the CNC machine. Such approaches lend themselves to a variety of mapping and/or locating purposes during factory calibration, troubleshooting, or at other points in the lifecycle of the CNC machine.

Figure 14:
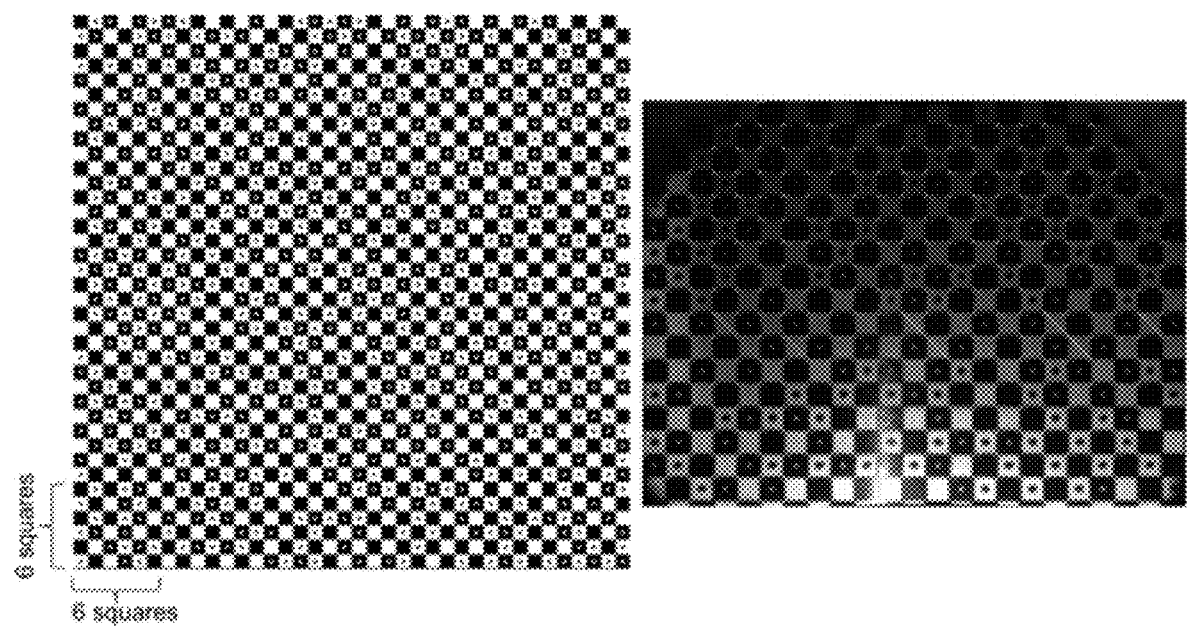
FIG. 14 is a diagram illustrating using fixtures or calibration tools for establishing a precise pixel location, consistent with implementations of the current subject matter.

To further illustrate, FIG. 14 is a diagram illustrating an example of how such fixtures or calibration tools may be used to establish the precise location of pixels by making use of a set of unique identifiers. As shown in FIG. 14, the set of unique identifiers can be a grid that includes one or more unique patterns (e.g., unique 6×6 patterns and/or the like). That is, the unique pattern in each grid can encode a corresponding unique identifier indicative of the location of that grid. In this example, CNC machine optics may be used to obtain at least one field of view of one or more grids. As each pattern is unique, the CNC machine may determine, based on the observed pattern and the corresponding unique identifier, which precise piece of the grid the camera at a given location is observing at a given time. It should be appreciated that a random number generator may be used to generate the grids. For instance, the random number generator can be used to generate the pattern included in each grid. The pattern in each grid may further be tested for uniqueness relative to the pattern included in the other grids.

Furthermore, movement and/or rotation (e.g. in the X, Y or Z dimensions) of an optical system component (such as a camera) followed by re-imaging of such a grid can yield positional data used in downstream location-based calculations including, for example, calculations to establish, with a threshold level of confidence, the location of an optical component in relation to other internal CNC machine components.

In some implementations of the current subject matter, use of a fixture and/or calibration tool having two or more tiered steps may be a useful way of establishing a library of optical image data that can be used as a reference for interpolating positional information, or for application of appropriate de-warping algorithm parameters that should be used when materials of varying thicknesses or properties are being analyzed or machined. The two or more tiered steps of the fixture and/or calibration tool may be achieved by having a stepped design to the fixture or calibration tool itself (as shown in FIG. 10C), or by virtue of a moveable component to the fixture or calibration tool itself. For instance, the fixture and/or the calibration tool may reside on a platform that can be precisely moved by a certain measurement (e.g. lifted with nanometer precision in the Z direction).

Alternatively and/or additionally, precision calibration may be achieved by the use of a fixture and/or calibration tool that incorporate tilt within its range of movement. These approaches may benefit from complementary calibration tools, such as use of depth-finding measurements to measure, verify or calibrate the associated height of a given tiered step; a laser range-finder may be useful in such applications (see FIG. 10). These approaches may have application in the replacement of machine parts (for example, as a result of wear and tear from regular use), and when the installation of a replacement part (e.g. a head) needs to be calibrated to align with the positioning of the previous part. In such cases, the previous data from factory calibrations may be used to pre-load the most appropriate calibration settings into the new part ahead of installation into the target machine.

Subsequent calibrations may also be performed based on earlier calibrations. For example, a high-precision calibration may be performed before processing a detailed print where it may be necessary to correct for, and operate with extreme precision (e.g. nanometer-scale). In such cases, a re-calibration that takes into account the minor variations and manufactured differences between the profiles of fixtures or tools used in the original factory calibrations may be necessary. Unique identifiers within the fixtures themselves may thus be useful for this purpose of enabling retrospective adjustments or calibrations relative to that of the original factory calibration; for example, if precise machining is required, the ultra-precise measurements of the individual fixture that was used in the initial factory calibration may be taken into consideration either at the time of original calibration or whenever the user indicates a higher level of calibration precision is needed (e.g., via activation of a deep scan mode).

Figure 7:
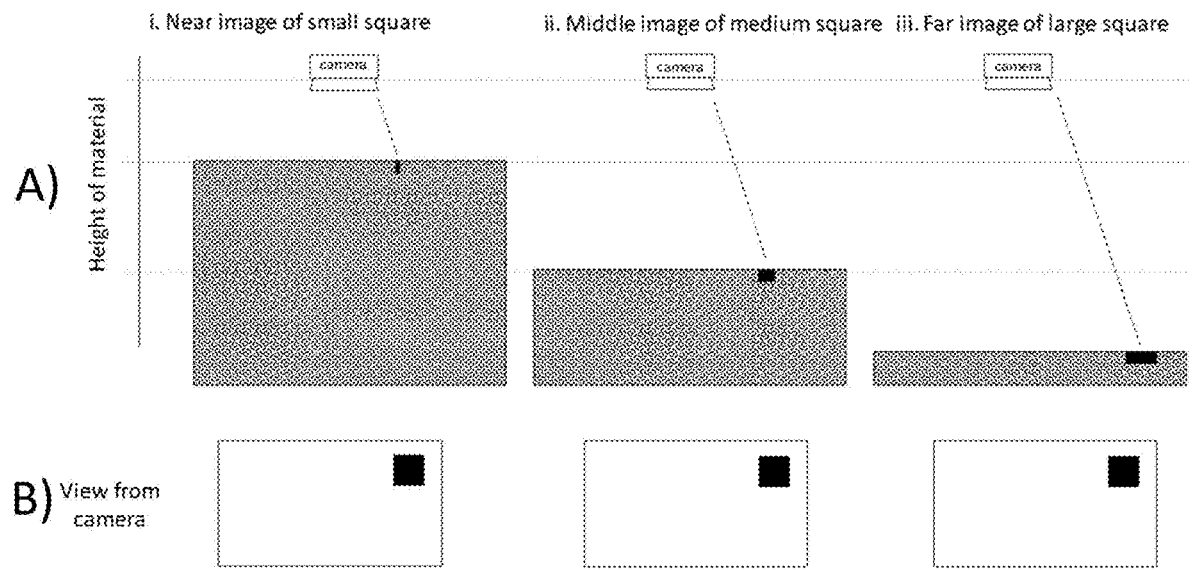
FIG. 7 is a diagram illustrating the appearance of different features at different distances from a camera can appear the same in images acquired by the camera, consistent with some implementations of the current subject matter.

FIG. 7 is a diagram illustrating how the appearance of different features at different distances from a camera can appear the same in images acquired by the camera, consistent with some implementations of the current subject matter. In another example, a pixel can refer to a range of possible locations in 3-dimensional space. The fact that there can be a range of possible locations is a limitation of using only a single 2D image to locate a spot in 3-dimensional space. In FIG. 7, the image (of the solid black portion in the material) as a spot can appear the same for a small location, close by, offset very little from the camera (FIG. 7 A i), a medium sized spot, offset a medium distance from the camera (FIG. 7 A ii), or a large location, far away, offset significantly from the camera (FIG. 7 A iii). A distance measurement, for example by a stereoscopic view, laser rangefinder, or a known material constant such as the height of the material being imaged, can disambiguate these situations and provide a solution to determine the correct singular location corresponding to the pixel(s) in the image. For this reason, some implementations can have multiple inputs to the image mapping, for example using multiple images or an image plus a distance measurement to locate a position in three-dimensional space.

In some implementations, an image of at least a portion of a material bed of a CNC machine can be captured with at least one camera located inside an enclosure that contains the material bed. A mapping relationship can map between a pixel in the image to a location at which the tool can affect a material within the processing area of the machine.

In some implementations, the determination can be stored as a mapping file or calibration file that can be used during operation of CNC machine to translate instructions for individual pixels, for example to commence machining at a location in an image indicated by the user, into commands for the CNC machine that reflect that goal. The determination can include compensating for a difference in the image relative to a shape of the material, shape of the material bed, or a shape of any object or feature shown in the image. More generally, the determination can include creating a mapping relationship that maps a pixel in the image to a location by compensating for one or more differences in the image relative to one or more physical parameters of the laser CNC machine and/or the material. These differences can include one or more of a shape of the material bed, lighting conditions within a housing of the laser CNC machine, a thickness of the material, a height of an upper surface of the material relative to the material bed, or the like.

Figure 8:
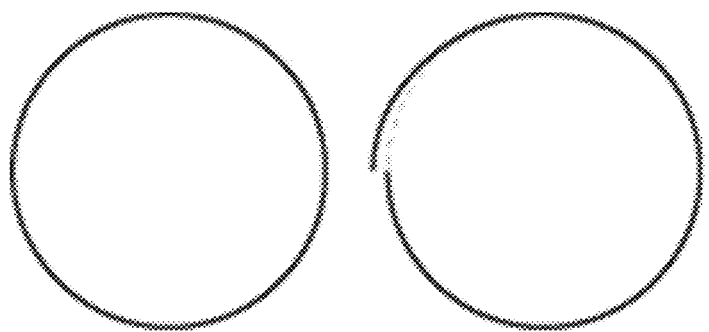
FIG. 8 is a diagram illustrating continuous recalibration during execution of a motion plan, consistent with some implementations of the current subject matter.

FIG. 8 is a diagram illustrating continuous recalibration during execution of a motion plan, consistent with some implementations of the current subject matter. In some implementations, this includes such calibration occurring in real-time, including continuous re-calibration during the execution of a motion plan. For example, an instruction to draw a circle is executed (to generate the circle on the left side of FIG. 8). The optical sensor can indicate that the expected path is broken, for example because the machine was bumped during processing, which, if uncorrected, could result in a line as shown by the right side of FIG. 8. In this example, the imaging system can observe the location of the tool head, the tool marks, and the material, and recalculate the relationship between all parts and the machine frame, bringing the system back to a known state. The machine can optionally then complete the operation correctly. Furthermore, the state of the pixel, for example, a color, can be translated into an instruction for one or more components of the CNC machine, for example, the laser.

One example method of calibration can be to deliver laser energy to one or more locations that are shown in the image. Based on a known location of the laser head, the location corresponding to a particular pixel in the image can be determined by detecting the effect of the laser on the material through the change to the particular pixel. One-to-one mapping is an example implementation of this, whereby a spot-to-pixel map is generated over the repeated process of drawing a spot at a location (for example chosen sequentially or at random), using a camera to image the spot and relate it to a pixel, and so on until a spot-to-pixel map of known locations. The pixel coordinates in the image and the corresponding location coordinates of the laser head in the CNC machine can be stored as the mapping file. During operation, the mapping file can be used directly, or can be used as a basis for interpolation or extrapolation to convert pixel coordinates to location coordinates and vice versa. Such a mapping is only correct at a fixed distance from the camera equal to the distance of the material on which the spots were drawn; for that reason, the distance between the camera and the material may be stored so that the correct distance may be confirmed before utilizing the mapping.

In another implementation, there may be multiple such operations performed to determine the parameters of that mapping at various distances. The distance to the actual material may be measured, for example via a laser rangefinder or entered manually by the user typing in a known quantity, and the mapping with the closest distance used.

In another implementation, two or more such mappings at various differences may be used to create a three dimensional model of how images at various x, y, and z coordinates (that is, 2d locations and distances from the camera) will appear on the camera, so the process may be reversed and accurate locations determined for images of arbitrary flat or variable-depth surfaces. This application may be important when precision of a CNC machine as a whole may be compromised and/or have been subjected to even small misalignments that may impact overall print performance. For example, during routine operation, the opening and closing of a lid of a CNC machine in between individual operating runs may result in marginally different positioning of optical components attached to the lid itself, perhaps due to hinge variance, the limit of certain manufacturing tolerances, operator inconsistencies, and/or the like. The level of stringency required in modeling interior components of a CNC machine in such situations may vary from taking and combining positional data from multiple optical images, through to the use of stereovision to take multiple or 3D images to triangulate position, and/or the use of uncertainty modeling of the variables that may be most likely to cause misalignment (i.e., modeling of lid hinge joint parameters and the associated confidence intervals that exist for multiple open/close events). Furthermore, the use of machine learning models (e.g., neural networks and/or the like) that run in the background of every image taken may be routinely analyzed across a variety of calibration-related applications. Such applications may include, for example, location-based calibrations (e.g., identification of a reference location for mobile machine components as in the case of head homing, camera alignments to ensure precise processing directly over a desired material location, etc.), material calibrations (e.g., determining material size, whether objects have been placed in the CNC machine for scanning or by accident, or to provide calibration context to an object; such as detecting the brand and model of an electronic device placed in the machine for tracing or engraving), anomaly adjustments (e.g, scorch marks detected lead to adjustments to the air fan directionality or speed), and/or the like.

The calibration process can include one or more mathematical operations that are performed to correct or compensate for non-linearity between the image and the actual geometry of the material bed such that the image is converted to appear as an accurate representation of the material bed area. One way of considering this process is as removal of distortions arising from proximity of the camera, perspective issues, color variations, etc. that can cause the incorrect end image to appear as an inaccurate representation of the material bed (and any material positioned on the material bed) rather than as a precise and accurate map of how the material bed and any material on it appear on a pixel by pixel basis without the above-noted effects.

Head Homing as an Example of Optical Calibration

Figure 9:
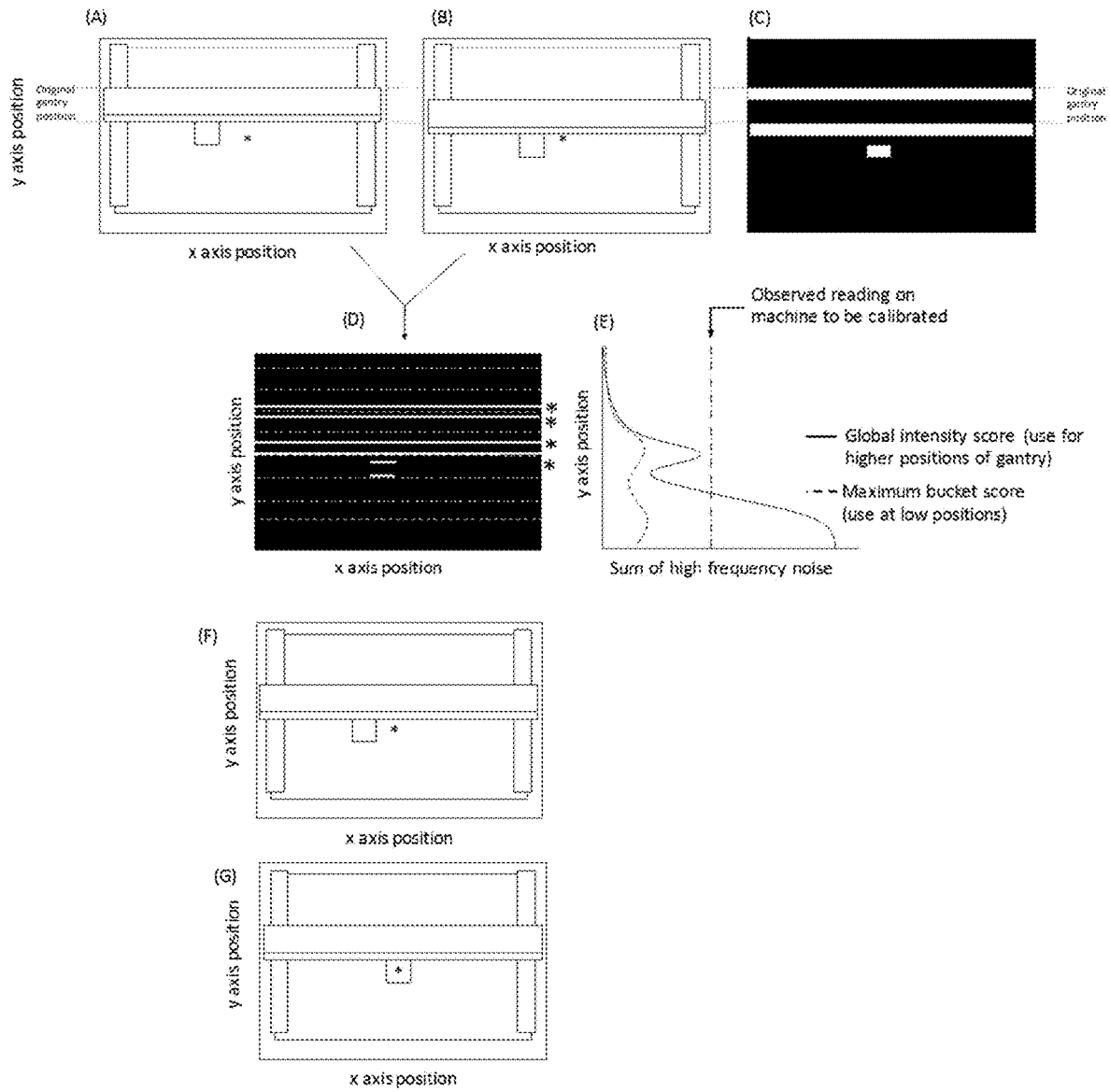
FIG. 9 is a diagram illustrating the location of a CNC machine component by optical calibration, consistent with some implementations of the current subject matter.

FIG. 9 is a diagram illustrating the location of a CNC machine component by optical calibration, consistent with some implementations of the current subject matter. The following example offers one implementation of a multi-step, automated process to precisely locate the head (and attached gantry) in either x or y dimensions, and determine the number of steps in either direction to send to head in order to calibrate a target position (e.g., centered position, "home position" at 0,0, etc.). In this example, the X and Y actions are assumed to be driven by stepper motors, capable of motion in the X and Y directions in increments of one "step", or small unit of distance. In this example, FIG. 9 shows the process of identifying the Y (vertical) location of a horizontal gantry in a CNC machine. First, the region of the image that contains the gantry is identified by taking an image (FIG. 9A), instructing the gantry to move a small distance, taking a second picture (FIG. 9B), and then subtracting the second picture from the first (FIG. 9C). The result will have dark pixels in regions that are identical and have light pixels in regions that changed between images. Other metrics to quantify the pixels that have changed can be implemented, for example, converting the image in a pixel to a numerical value based on brightness, color, or the like. This resulting differential image helps to identify regions of interest in locating the gantry. Next, a high-pass filter such as a Sobel filter can be used to identify the regions of the image (FIG. 9D) that are "edges." This filtered image is, for analytical purposes, can be sub-divided into "buckets" that allow for simplified analysis of the high frequency signal data that came out of the Sobel filter (FIG. 9E). This enables a variety of heuristics to be used to identify the position of the gantry. Examples of useful parameters used in these heuristics include, but are not limited to, the global intensity score (i.e., the sum of high frequency signal across all buckets), which may, for example, be used to identify when the gantry is in the middle region of the image, where the gantry reflects maximum light. In this case, the algorithm may switch strategies depending on the global intensity score, using for example the maximum bucket score (i.e., the bucket and corresponding score with the most intense high frequency data) to further narrow down the precise location of the gantry when it is known to be in the central region. Calculated parameters, such as the global intensity and maximum bucket scores, may then be examined within the context of pre-determined, factory-calculated power functions, which can express the expected levels of high frequency signal relative to known head positions along a given axis (FIG. 9D). This "homing context step" can be conducted using factory calibrations at the level of the individual machine, a manufactured lot of machines, or in the broadest sense (i.e., used across an entire model or product line). The decision as to which level of calibration is most appropriate, can depend on manufacturing variances (e.g., variance attributable small differences in lid camera positioning or offsets, potential aberrations in gantry, etc.), or on the degree of imaging sophistication used in calibration (e.g., 3D scanners). The position of the head can also be calibrated by moving the unit to a known position, for example driving the motors until they are not capable of further travel, and then moving to different locations and capturing images that can be used for calibration. Selection and interpretation of the parameters that are deemed important in the homing context step may vary, or require differential thresholds to optimize their application. As an example, the internal features within the CNC machine itself, may possess position-dependent high frequency signal properties that may confound signal interpretation, thus rendering one calculated parameter superior to another for the purpose of locating the head along a particular axis. FIG. 9D shows that for positions where the head is towards the front of CNC machine, a reflective laser tube installed on the gantry is a prominent feature imaged by the lid camera, resulting in larger global scores that can be reliably used to locate the y-axis. Conversely, maximum bucket score may be more appropriate for robust interpretation of y-axis positioning in cases where the gantry is closer to the rear of the unit. Further manipulations to the lighting environment within the CNC machine (e.g., turning internal lights off or additional lights on), may be utilized in order to generate more favorable conditions during calibration.

In an alternative implementation of head homing, pattern recognition techniques may be useful. For example, as shown in FIG. 9F and FIG. 9G, image capture of a fiducial mark (e.g., a logo located on the head of a CNC machine— shown by the "*"), may be used to pattern match, scaling in and out relative to a known image until fine-grain calibration accuracy is achieved.

Height-Sensing as an Example of Optical Calibration

Figure 10:
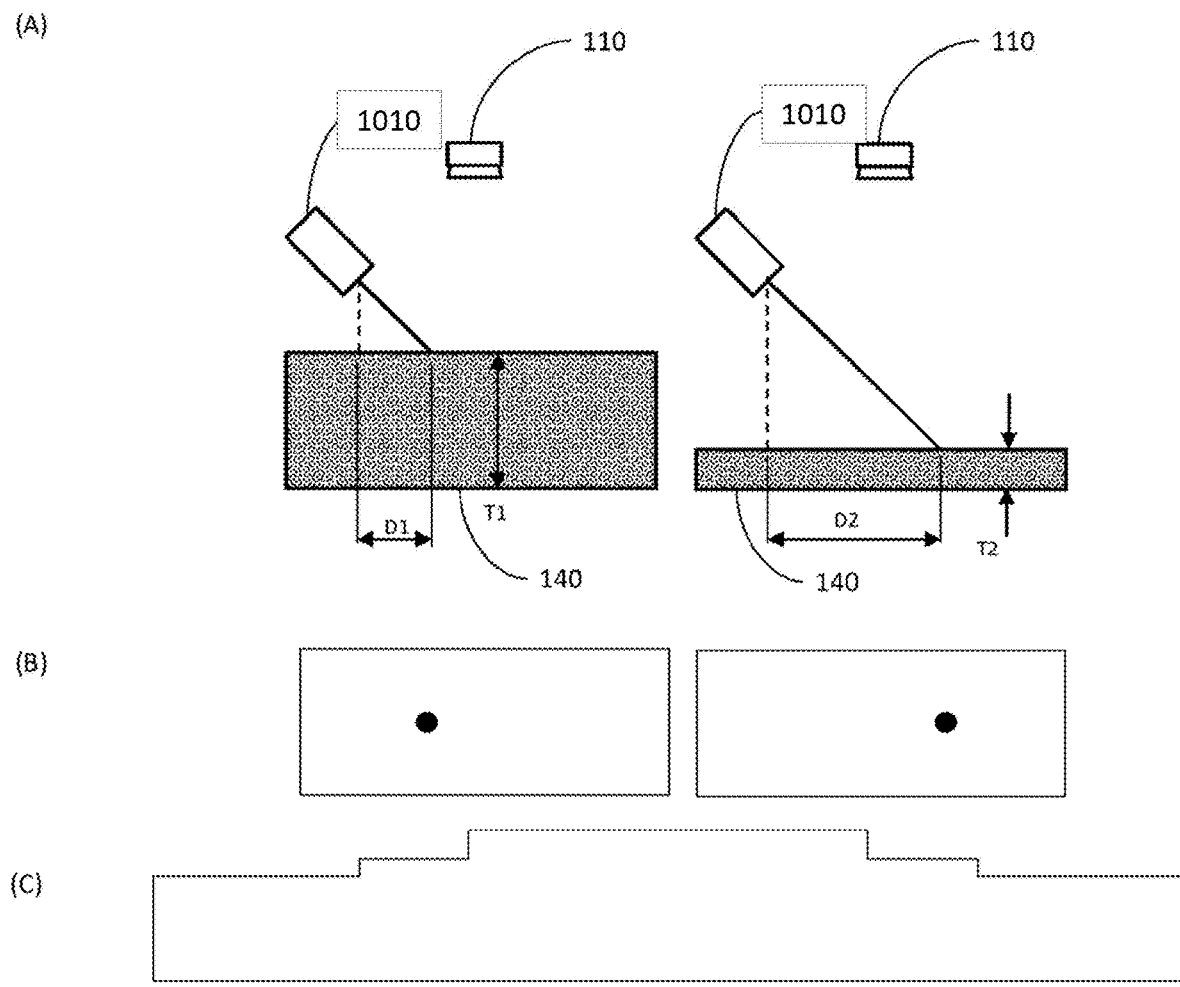
FIG. 10 is a diagram illustrating of a method for optical calibration based on height sensing, consistent with some implementations of the current subject matter.

FIG. 10 is a diagram illustrating of a method for optical calibration based on height sensing, consistent with some implementations of the current subject matter. A variety of methods may be used to achieve accurate determination of the distance from the tool to the surface of the material or other key spatial relationships that are important for proper machine tool usage. In one implementation, shown in FIG. 10 A, a distance measuring laser 1010 that is visible to an optical sensor such as a camera shines a dot on the surface of the material 140 that can be imaged by the camera and whose location within the frame of the camera may be used to interpolate heights of the surface of materials given some calibration data (FIG. 10 B). The distance measuring laser can be replaced by a collimated light source, a traditional LED with low divergence, or other means of projecting a dot that can be imaged by the camera. As shown in FIG. 10 C, some implementations can benefit from the use of a specially calibrated jig with a number of steps of known heights. During calibration, the position of the head can be moved in such a way that it shines light (e.g., from the aforementioned laser or collimated light source) on steps of the jig; images of the visible light may be taken at each position, and the height of the jig—known from manufacturing parameters of the jig—can be recorded. The visible beam strikes the material at an angle, such that the position of the dot in the frame of the camera image will move an amount related to the step height; by calibrating where the beam lands in the camera image for a sufficient number of step heights, interpolation for heights within this calibrated range is possible. In an extension to this implementation, de-warping techniques, (e.g., known reference regions such as checker-board patterns of known shape and against which distortion may be measured and compensated for) may be used to calibrate intrinsic camera parameters (e.g. tilt, pose, fisheye, chromatic aberration, etc.) relative to its view of the bed.

Material Thickness Determination—General

A variety of methods can be used to determine the thickness of the material 140 to be cut or engraved. One method can be to determine the height of a top surface of the material 140 and compare this height to a known position of a bottom surface of the material 140. Typically, though not necessarily, the bottom surface of the material 140 coincides with the top surface of the material bed 150, which can be of a known height. The difference between the height of the top surface of the material 140 and the height of the bottom surface of the material 140 can then be determined to be the thickness of the material 140. In another implementation, the process used to determine the thickness of the material 140 can be calibrated by measuring a material 140 with a known thickness. For example, an object with a 1 cm thickness can be placed on the material bed 150. Data can be acquired by the cameras and the data can be associated with the known thickness of the object. In another implementation, the cameras can determine the height of the surface the material 140 is resting on. For example, if there are other pieces of material 140 between the topmost material 140 and the material bed 150, the cameras can measure the height of the topmost surface before material 140 is inserted or measure the height of the topmost surface in a location not obscured by the material 140.

In one implementation, the height at different points can be measured, for example in a grid pattern, on the surface of the material 140 in order to characterize the curvature of the material 140. Once the height at many points on the material 140 is known (and consequently the surface curvature), instructions can be generated so that one or more actuators can follow the curve of the material 140. For example, a cutting laser can be kept in focus, a camera can be kept in focus, a 3D printer head can maintain a constant separation from the material base, or a CNC milling bit can be kept a constant distance from the material 140.

Furthermore, the same process can be repeated with the bed or surface upon which the material rests, for example before the material is placed on the bed. Then, the knowledge of the possibly-curved surface of the bed and possibly-curved surface of the material can be combined by subtracting the bed height from the material height at each x-y location. There may be voids between the bed and the material, for example if the material is warped, but if the material is of uniform thickness and touches the bed at a minimum of one location then the smallest value of (material height—bed height) will be the material thickness. Material thickness, distinct from height, is useful in, for example, ensuring that tab-and-slot joinery will fit properly.

Therefore, in some implementations, the height of the material relative to a known height of a point in the CNC machine can be determined. The point can include a point on the head, a fixed point on the housing of the CNC machine, a structural feature connecting the laser to the material bed, or the like. Heights can be measured at multiple locations in a preset pattern, such as a grid, across the material, or at a sufficient number of random locations on the material. Based on any number of height measurements, the minimum height can be determined and assigned as the material thickness.

Once the distance between the surface and a lens (or any other reference point in the CNC machine 100) is known, this can be incorporated to precisely control the height of the head 160 (and optics internal to the head 160) when machining.

Contrast detection, phase detection, or any other distance finding techniques described herein can also be implemented on other machines, for example, a CNC mill where the distance determines where the head 160 is to position a bit. In this way, the motion plan can incorporate, for example, contrast detection, autofocus, etc. to perform real-time analysis of the position of the material 140 and/or the position of the head 160 relative to the material 140.

Direct Inspection of Material Thickness

In another implementation, the material 140 can be imaged by a camera at a low angle relative to the surface of the material. The angle can be, for example, 0 degrees (parallel to the surface), less than 5 degrees, less than 10 degrees, etc. This "edge-on" view allows a direct determination of the height of the material. Here, an image of the material can be acquired. The height or thickness of the material 140 is related to the number of pixels of the material in the image. In some implementations, a distance measurement between the camera and the edge of the material can first be performed. Based on the distance from the camera to the edge which is being imaged, a conversion can be performed between the height in pixels and the material height.

Figure 11:
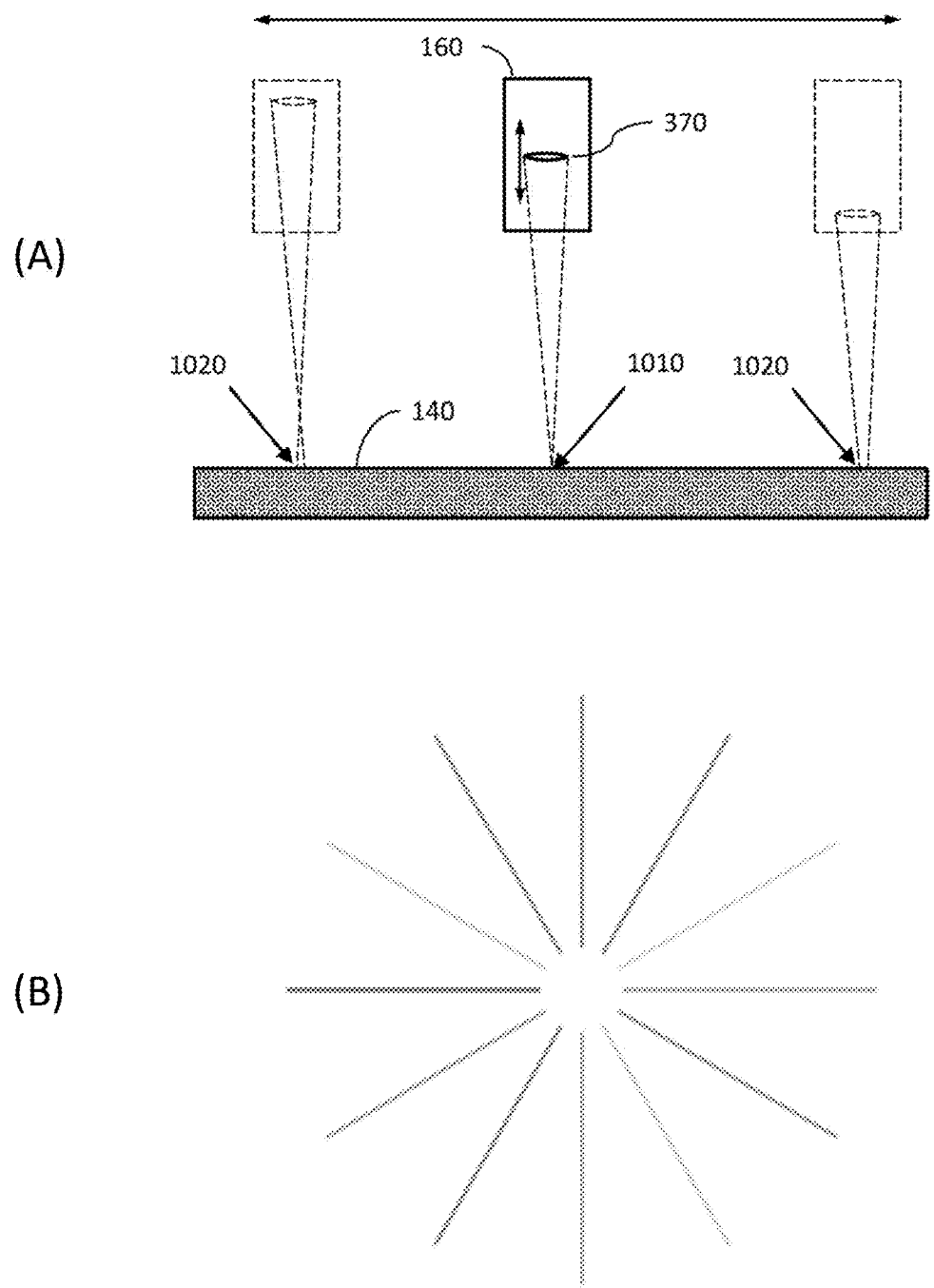
FIG. 11 is a diagram illustrating a method for correlating the height of the material and the focal length of the lens, consistent with some implementations of the current subject matter.

FIG. 11 is a diagram illustrating a method for correlating the height of the material and the focal length of the lens, consistent with some implementations of the current subject matter. In some implementations, for example those described in FIG. 9, knowledge of the position of the lens within the height system can be important for optical calibration. Therefore, the height of the material and the focal height (Z) of the lens must be correlated. The height of the material may be determined as described above. One approach to determining the Z height of the lens can involve construction of a series of calibration cuts by using the processing laser to cut material at different lens positions, as instructed by the stepper motor driving the lens up and down (FIG. 11 A). The radial spokes diagram in FIG. 11 B provides an example of a pattern that can be used to calibrate for Z height. Each spoke can correspond to a different Z height of the lens. This particular pattern offers the advantage of being imaged in a single frame by a camera that is mounted near the lens, close to the material, with a narrow field of view. The pattern may be positioned (e.g., on a calibration jig with a disposable insert upon which the pattern is engraved) such that no additional material changes between height-sensing and Z-height calibrations are necessary.

In some implementations, the area of each of the radial spokes can be calculated using a Bayesian approach that analyzes the distribution of line thicknesses and determines the position of lens that would produce the thinnest line, even if that position is between two of the example lines drawn. This thinnest line necessarily occurs when the distance between the lens and the material is equal to the focal length of the lens. Since this approach does not rely on any assumed knowledge of the focal length of the lens, but rather calculates the optimal lens distance from the material at a given material height from observed behavior, this particular approach accounts for any manufacturing variance in focal length of the lens that may exist. Note that it does not identify the focal length of the lens numerically, only the stepper motor settings that position the lens at the proper distance from the material.

In other implementations, lines of varying width can be cut or engraved in the material, where the varying can be performed by scanning a focal point of the laser by movement of one or more optical components in the laser or laser head. The scanning can be fixed during one line (e.g. one of the radial line) but changed between each radial line. Any number of lines can be made at different CNC machine settings. The width of the lines can be imaged and calculated, and an optimal configuration of the laser head can be determined based on finding the thinnest line. When the optimal configuration lies between settings that were tested, the function of the change in line width versus the changes in CNC machine settings can extrapolated, interpolated, or otherwise curve-fit to determine the optimal settings (e.g. position of a focusing lens that results in the most focused laser beam at the material surface) based on the available sample cuts.

Additionally, such an approach as described in FIG. 11 may also be used during periodic calibrations during the lifecycle of a CNC machine, such as for the purpose of analyzing and detecting drift in kerf over time. This may be performed via machine learning algorithms that instruct the CNC machine to use known calibration patterns, make use of organic images of processed CNC machine-made cuts in material (i.e., such as those produced during normal operations), and/or the like in order to detect anomalous kerf readings and provide feedback adjustments of machine parameters.

Alternative implementations of material height-sensing calibration methods include use of a reference beam to strike the surface of a material, while a probe beam measures the height of the lens moved by the stepper motor to various Z heights; the distances between the two height readings may be subtracted and a calibration curve based on the distance from the lens to the material can be created.

Figure 12:
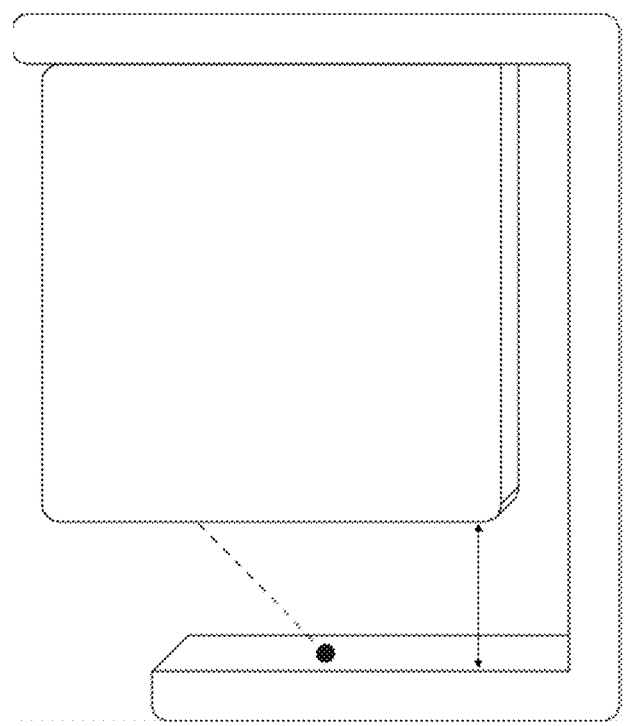
FIG. 12 is a diagram illustrating an absolute determination of the distance of the head from the material, consistent with some implementations of the current subject matter.

FIG. 12 is a diagram illustrating an absolute determination of the distance of the head from the material, consistent with some implementations of the current subject matter. In another example, the distance from the head containing the laser to the material can be determined absolutely, and not solely in reference to the processing laser's focusing lens. As shown in FIG. 12, this can be performed by imaging a spot from the distance-measuring laser incident on a material of known distance relative to the head. Using information on the relationship between laser dot position in the camera image and material distance determined during focus calibration, and the measurement of the laser dot position relative to the camera image combined with the known distance between the material and the head, the absolute distance to any surface can be determined.

Location Identification Via Correlation of Lid and Head Camera Images

In another implementation, the lid and head camera images may be coordinated such that alignment of their respective images via capture of common images is possible. For example, it may be possible to de-warp both images to be flat, square and such that the head camera captures a small, common feature also imaged by the lid camera (e.g. a dot on a piece of material that can be used to adjust the offset between two images until the dot appears in the same location in each). By determining the precise position of the head and dot from the head image (e.g., determined via such approaches as "head homing" outlined above), the head and lid images may be correlated for mapping of broader features that are captured by the lid camera, but not within the field of view of the head camera. For example, if a small piece of material is to be imaged precisely, the system may first capture a lid image. The head can then be moved so that a head image may be taken of the region indicated by the lid image to contain the material. The distance of the head to the surface of the material can be measured by means of the distance laser and head camera. At this point, high resolution imagery and depth information of the small piece of material are both available.

In a further implementation, the calibration process and the creation of the mapping relationship can also account for deviations between a laser head position and where the laser beam is actually emitted. Such deviations can arise due to small misalignments in the laser beam path and optical components, such that a location of the beam emitted from the head may differ relative to the laser head position according to where in the x-y plane the laser head is currently positioned. For example, if a beam is not in proper alignment with the optical systems, it may not impact the material at the focal point of the lens. Instead, it may drift in its location relative to the focal point as the laser head is moved around the bed. An optical system can measure this drift by printing calibration patterns or by observing errors in requested production processes and compensate for it. Similar compensation can be used for other predictable errors, such as those which have a linear relationship to the laser head position, for example compensating for misaligned rails in a linear system that introduce an angular offset to straight lines.

With the appropriate mapping stored at the CNC machine or the computing system commanding it, the mapping file can be used to convert instructions for the image into commands for the CNC machine. For example, a user, through a graphical user interface, or a motion plan, can instruct that material represented by a given pixel be engraved to a particular depth. The location coordinate in the CNC machine corresponding to the pixel coordinate can be determined from the mapping file. The CNC machine can move the laser head to the location coordinate. The CNC machine can then execute the command for the laser to engrave the material to the particular depth by applying measured amounts of laser power.

The compensating applied to the image can include, for example, at least one of: de-warping the image, de-distorting the image, color adjusting the image, measuring a thickness of the material, correcting for a variable alignment between a laser head position and where the laser energy is emitted, correcting for surface topography, correcting for capturing a side view of the material having a thickness that is viewed from the camera, or the like. The image can be modified prior to generating the mapping file and can incorporate additional mappings corresponding to the one or more modifications.

Image Aberration Correction

Figure 13:
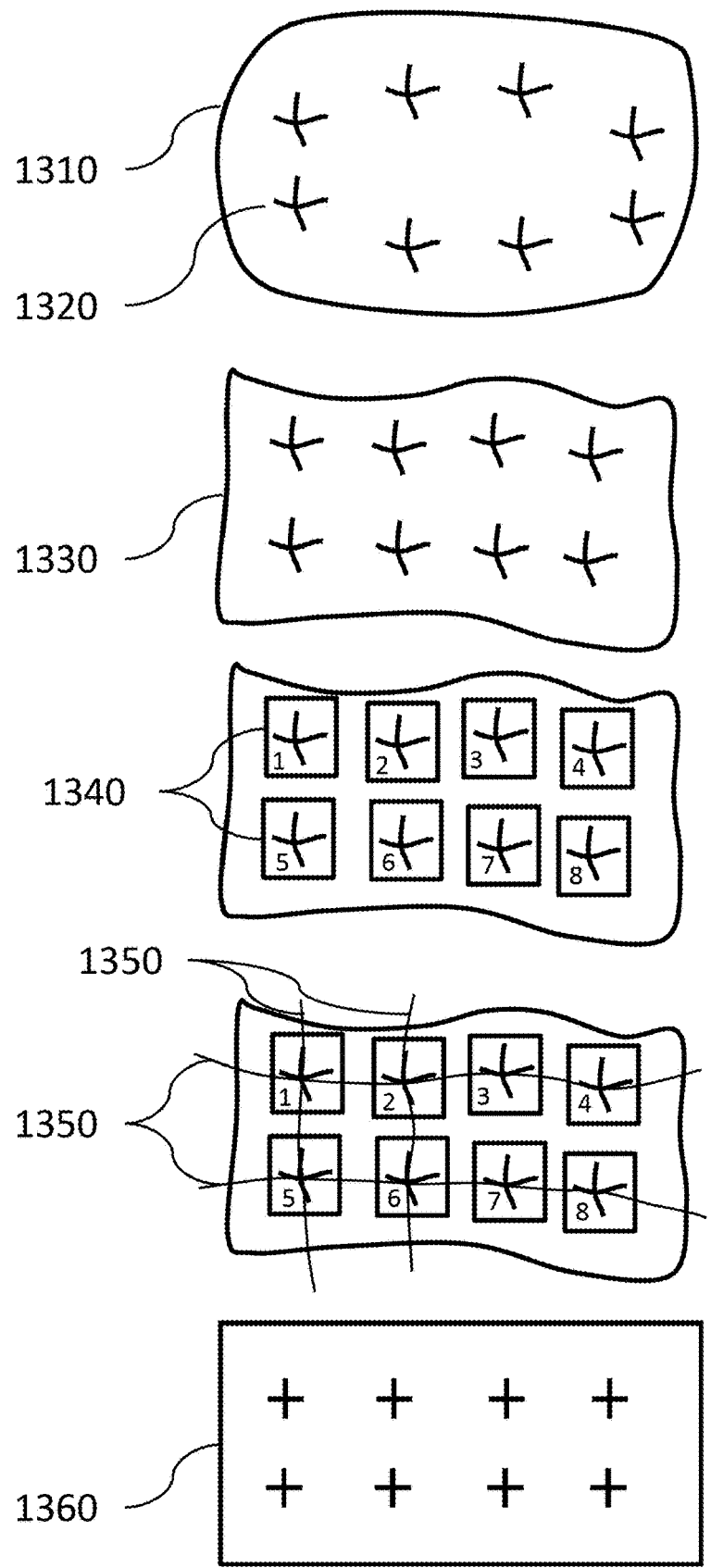
FIG. 13 is a diagram illustrating correcting aberrations in images acquired by a camera with a wide field of view, consistent with some implementations of the current subject matter.

FIG. 13 is a diagram illustrating correcting aberrations in images acquired by a camera with a wide field of view, consistent with some implementations of the current subject matter. A principal challenge of wide-angle imaging inside a small working space with the unit closed is the distortion introduced by the wide-angle lens required. Images from cameras, particularly those with a wide field of view, can suffer from multiple types of distortions. In one implementation, an image correction program can be executed to convert distorted image data 1310 (which can be considered to be the sum of a perfect image and a distortion) to corrected image data 1360 (which can be either a perfect image or at least an image with reduced distortion). The distortion correction can include processing an image to achieve one or more (or optionally all) of removing the distortion, enhancing the image by increasing contrast, and mapping pixels in the image to corresponding physical locations within the working area, or other areas in the CNC machine. The distortions can be due to optical components in a camera, such as a wide angle lens, the de-centration of an imaging sensor within said lens, chromatic aberrations, reflections or reflectivity, damage or undesirable coatings on the lens, etc. These distortions can be compounded given external factors related to the orientation of the camera 110 with respect to the material bed 150 it is observing as a result of its mount on the lid 130 including the camera's position, rotation and tilt. After making the corrections, the image data can be replaced with, or used instead of, the corrected image data prior to identifying conditions in the CNC machine 100 or performing further image analysis.

In another implementation, the conversion can be performed by imaging one or more visible features 1320 shown in the distorted image data. In the example shown in FIG. 13, the visible features 1320 can be crosses distributed with a known distance separation across a surface of an object. The distorted image 1310, which includes the visible features 1320, can be acquired. A partially de-distorted image 1330 can be generated by applying a barrel de-distortion function to the distorted image 1310. The partially de-distorted image 1330 can be separated into smaller images 1240, with each of the smaller images 1340 including only one of the visible features 1320. The plurality of smaller images 1340 can be sorted (as shown by the numbering in the smaller images 1340), based on coordinates of the visible features 1320, into at least one set of visible features, the set of visible features being approximately co-linear. For example, smaller images 1, 2, 3, and 4 can be determined to be co-linear (in the X direction) and smaller images 1 and 5 can be determined to be co-linear (in the Y direction). Mathematical expressions for a line 1350 that passes through each of the coordinates can be calculated for each of the set of visible features and based on the coordinates of the visible features 1320 in the corresponding set. The line 1350 can be, for example, a polynomial fit to the set of visible features 1320, a spline, etc. The distorted image data 1310, at any point in the image data, can be converted to the corrected image data 1360 by applying a correction to the distorted image data 1310 based on an interpolation of the mathematical expressions to other points in the distorted image data 1310. For example, the interpolation can be between lines 1350 that extend in two orthogonal directions (i.e. a grid pattern shown in FIG. 13). The linear distance between the interpolated lines can correspond to less than 5 pixels, less than 3 pixels, or a single pixel. Optionally, coarser interpolation can be used that extends over more pixels than those mentioned previously.

In other implementations, a preview can be generated that can include a view of the material and one or more features of a design to be cut into the material. The one or more features can reflect the determined relationship between the individual pixels in the image and a number of locations at which the laser can deliver energy to make cuts in the material. The view can be a graphical image generated on a computing device. For example, a camera at some angle relative to the material bed can image a square drawn on a piece of wood placed on the material bed. Because the camera is not looking directly down at the material, the image initially captured will appear elongated in some direction. By applying the mapping, the view of the material and square can be generated not in the elongated shape but instead modified to appear with the proper proportional dimensions. A user can enter instructions to modify the image, for example, drawing a diagonal line through the square. Based on the mapping between the pixel coordinates in the modified image and the location coordinates in the CNC machine, commands can be issued to the CNC machine to cut or engrave the indicated line at the proper location coordinates.

During the calibration process or at any time during operation of the CNC machine, the image can be captured with a first camera and a second camera can be directed to acquire a second image corresponding to at least part of the first image. Also, a location of the second camera can be determined using the first camera. In some implementations, the first camera can be the lid camera and the second camera can be the head camera. Though in other implementations, any camera operatively connected to or viewing any part of the CNC machine or the material can be the first camera or the second camera.

In some implementations, operation of a component can be imaged by a camera as part of calibrating the component. For example, the laser head can be commanded to take a certain number of steps via its actuator. A camera can image how the laser head moves during execution of the command and convert those steps into a sequence of location coordinates. The coordinates of the laser head can be compared with the command to, for example, provide a calibration factor for the system when commanding the laser head to move, detect skips or other anomalies in movement of the laser head, etc. Other components in the CNC machine can also be imaged in a similar manner and the images translated into real coordinates in the CNC machine for analysis or calibration.

Figure 15:
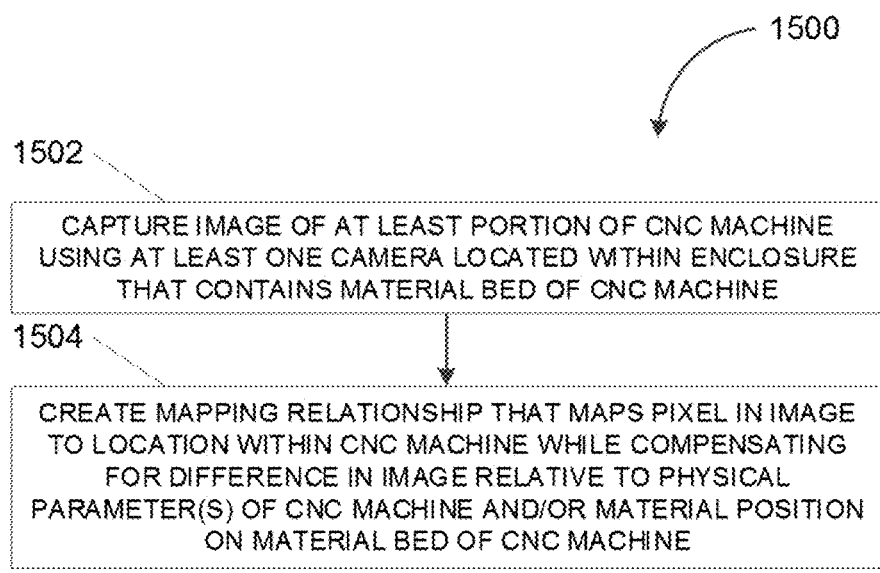
FIG. 15 is a flowchart illustrating a process for calibrating a CNC machine, consistent with implementations of the current subject matter.

FIG. 15 is a flowchart illustrating a process 1500 for calibrating a CNC machine, consistent with implementations of the current subject matter. Referring to FIG. 15, the process may be performed by the CNC machine 100 and/or one or more data processors coupled with the CNC machine 100.

The CNC machine 100 can capture of an image of at least a portion of the CNC machine 100 using at least one camera located within an enclose that contains a material bed of the CNC machine 100 (1502). In some implementations of the current subject matter, the CNC machine 100 can include one or more cameras (e.g., head camera 160) that are capable of capturing an image of at least a portion of the interior of the CNC machine 100. These cameras can include, for example, a single wide-angle camera, multiple cameras, a moving camera where the images are digitally combined, and/or the like.

The CNC machine 100 can create a mapping relationship that maps a pixel in the image to a location within the CNC machine 100 while compensating for a difference in the image relative to one or more physical parameters of the CNC machine 100 and/or a material positioned on the material bed of the CNC machine 100 (1504). As noted, optical systems such as, for example, cameras and/or the like, can provide greater utility when their output is correlated with other values such as known physical references within the CNC machine 100. Thus, a one-time, repeated, and/or continual calibration can be performed such that measurements of known quantities can be made by optical systems and any deviation of the measured value from the known value can be recorded and used to compensate for future deviations. In some implementations of the current subject matter, these calibration can include mapping a pixel in the image captured by the cameras at operation 1502 to a physical location within the CNC machine 100. For instance, this mapping may include translating the pixels within the image to CNC machine coordinates that correspond to locations within the CNC machine 100 at which a tool coupled with the CNC machine 100 (e.g., laser, drill, and/or the like) can process a material disposed within the CNC machine 100 (e.g., on the material bed 150).

According to various implementations of the current subject matter, a method for calibrating a CNC machine can include capturing one or more images of at least a portion of the CNC machine. The one or more images can be captured with at least one camera located inside an enclosure containing a material bed. A mapping relationship can be created which maps a pixel in the one or more images to a location within the CNC machine. The creation of the mapping relationship can include compensating for a difference in the one or more images relative to one or more physical parameters of the computer-numerically-controlled machine and/or a material positioned on the material bed.

The CNC machine can include at least one tool configured to deliver electromagnetic energy to at least one location on the material positioned on the material bed.

The one or more physical parameters of the CNC machine and/or the material comprise one or more of a shape of the material bed, lighting conditions within a housing of the CNC machine, a thickness of the material, and a height of an upper surface of the material relative to the material bed.

A pixel coordinate in the one or more images can be mapped, based at least on the mapping relationship, to a location coordinate in the CNC machine. An instruction corresponding to the pixel coordinate can be converted to a command for execution at the location. The conversion can be based at least on the mapping of the pixel coordinate in the one or more images to the location coordinate in the CNC machine. The command can be executed as part of a motion plan for the CNC machine.

The compensation can include at least one of: de-warping the one or more images, de-distorting the one or more images, color adjusting the one or more images, measuring a thickness of the material, correcting for a variable alignment between a position of a source of electromagnetic energy and a location where electromagnetic energy is emitted, correcting for surface topography, and correcting for capturing a side view of the material having a thickness that is viewed from the camera.

A preview including a view of the material and one or more features of a design to be cut into the material can be generated. The one or more features can reflect at least the mapping relationship between the pixel in the one or more images and the location within the computer-numerically-controlled machine. The location can correspond to a location to which electromagnetic energy is delivered in order to effect at least one change in the material.

The capturing of the one or more images can include capturing a first image with a first camera and directing, based at least in part on the first image, a second camera to capture a second image. The location of the second camera can be determined based at least on the first image and/or the second image.

The creation of the mapping relationship further includes compensating for a deviation between a source of electromagnetic energy within the computer-numerically-controlled machine and a location to which the electromagnetic energy is delivered.

The image can include one or more unique patterns from a calibration tool that includes a plurality of unique patterns. The mapping relationship can be created based at least on a location of the one or more unique patterns within the calibration tool.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A computing system, comprising:
at least one processor;
a non-transitory computer-readable medium; and
program instructions stored on the non-transitory computer-readable medium that are executable by the at least one processor such that the computing system is configured to:
  access one or more images showing (i) at least a portion of a material bed located inside an enclosure of a computer-numerically-controlled machine and (ii) a workpiece positioned on the material bed, wherein the one or more images are captured by one or more cameras located inside the enclosure of the computer-numerically-controlled machine;
  process the one or more images to identify one or more differences in the one or more images relative to one or more known physical characteristics of the computer-numerically-controlled machine and (i) a thickness of the workpiece or (ii) a height of an upper surface of the workpiece relative to the material bed;
  determine a mapping relationship by mapping pixels in the one or more images to corresponding physical locations within the computer-numerically-controlled machine in a manner that compensates for the identified one or more differences;
  generate a machine file or a motion plan for an intended fabricating pattern based at least on the determined mapping relationship; and
  cause the computer-numerically-controlled machine to implement the intended fabricating pattern on the workpiece by delivering electromagnetic energy to the workpiece based on the machine file or the motion plan.

2. The computing system of claim 1, wherein the one or more known characteristics of the computer-numerically-controlled machine comprise a shape of the material bed or lighting conditions within the enclosure.

3. The computing system of claim 1, further comprising program instructions stored on the non-transitory computer-readable medium that are executable by the at least one processor such that the computing system is configured to:

measure the thickness of the workpiece or the height of the upper surface of the workpiece relative to the material bed.

4. The computing system of claim 1, wherein the mapping the pixels in the one or more images to the corresponding physical locations within the computer-numerically-controlled machine in the manner that compensates for the identified one or more differences comprises mapping a particular pixel coordinate corresponding to a particular pixel in the one or more images to a particular location coordinate corresponding to a particular location within the computer-numerically-controlled machine; and wherein the generating the machine file or the motion plan comprises converting an instruction corresponding to the particular pixel coordinate to one or more commands for execution at the particular location.

5. The computing system of claim 1, wherein the mapping the pixels in the one or more images to the corresponding physical locations within the computer-numerically-controlled machine in the manner that compensates for the identified one or more differences comprises using the identified one or more differences to correct a warping or distortion in the one or more images.

6. The computing system of claim 1, further comprising program instructions stored on the non-transitory computer-readable medium that are executable by the at least one processor such that the computing system is configured to:

generate a preview image comprising a view of the workpiece and one or more features of the intended fabricating pattern on the workpiece, the one or more features reflecting at least the mapping relationship between the pixels in the one or more images and the corresponding physical locations within the computer-numerically-controlled machine.

7. The computing system of claim 1, wherein the one or more cameras comprise a first camera and a second camera, and wherein the computing system further comprises program instructions stored on the non-transitory computer-readable medium that are executable by the at least one processor such that the computing system is configured to:

cause the first camera to capture a first image of the one or more images; and based at least in part on the first image, cause the second camera to capture a second image of the one or more images.

8. The computing system of claim 7, further comprising program instructions stored on the non-transitory computer-readable medium that are executable by the at least one processor such that the computing system is configured to:

determine the one or more known physical characteristics of the computer-numerically-controlled machine, wherein the determining the one or more known physical characteristics of the computer-numerically-controlled machine comprises determining a location of the second camera based at least on the first image or the second image.

9. The computing system of claim 1, wherein the one or more images include one or more distinct patterns from a calibration tool that includes a plurality of distinct patterns, and wherein the determining the mapping relationship comprises determining the mapping relationship based at least on a location of the one or more distinct patterns within the calibration tool.

10. A non-transitory computer-readable medium, wherein the non-transitory computer-readable medium is provisioned with program instructions that, when executed by at least one processor, cause a computing system to:

access one or more images showing (i) at least a portion of a material bed located inside an enclosure of a computer-numerically-controlled machine and (ii) a workpiece positioned on the material bed, wherein the one or more images are captured by one or more cameras located inside the enclosure of the computer-numerically-controlled machine;

process the one or more images to identify one or more differences in the one or more images relative to one or more known physical characteristics of the computer-numerically-controlled machine and (i) a thickness of the workpiece or (ii) a height of an upper surface of the workpiece relative to the material bed;

determine a mapping relationship by mapping pixels in the one or more images to corresponding physical locations within the computer-numerically-controlled machine in a manner that compensates for the identified one or more differences;

generate a machine file or a motion plan for an intended fabricating pattern based at least on the determined mapping relationship; and cause the computer-numerically-controlled machine to implement the intended fabricating pattern on the workpiece by delivering electromagnetic energy to the workpiece based on the machine file or the motion plan.

11. The non-transitory computer-readable medium of claim 10, wherein the one or more known characteristics of the computer-numerically-controlled machine comprise a shape of the material bed or lighting conditions within the enclosure.

12. The non-transitory computer-readable medium of claim 11, wherein the non-transitory computer-readable medium is also provisioned with program instructions that, when executed by at least one processor, cause the computing system to:

measure the thickness of the workpiece or the height of the upper surface of the workpiece relative to the material bed.

13. The non-transitory computer-readable medium of claim 10, wherein the mapping the pixels in the one or more images to the corresponding physical locations within the computer-numerically-controlled machine in the manner that compensates for the identified one or more differences comprises mapping a particular pixel coordinate corresponding to a particular pixel in the one or more images to a particular location coordinate corresponding to a particular location within the computer-numerically-controlled machine; and wherein the generating the machine file or the motion plan comprises converting an instruction corresponding to the particular pixel coordinate to one or more commands for execution at the particular location.

14. The non-transitory computer-readable medium of claim 10, wherein the mapping the pixels in the one or more images to the corresponding physical locations within the computer-numerically-controlled machine in the manner that compensates for the identified one or more differences comprises using the identified one or more differences to correct a warping or distortion in the one or more images.

15. A method carried out by a computing system, the method comprising:

accessing one or more images showing (i) at least a portion of a material bed located inside an enclosure of a computer-numerically-controlled machine and (ii) a workpiece positioned on the material bed, wherein the one or more images are captured by one or more cameras located inside the enclosure of the computer-numerically-controlled machine;

processing the one or more images to identify one or more differences in the one or more images relative to one or more known physical characteristics of the computer-numerically-controlled machine and (i) a thickness of the workpiece or (ii) a height of an upper surface of the workpiece relative to the material bed;

determining a mapping relationship by mapping pixels in the one or more images to corresponding physical locations within the computer-numerically-controlled machine in a manner that compensates for the identified one or more differences;

generating a machine file or a motion plan for an intended fabricating pattern based at least on the determined mapping relationship; and causing the computer-numerically-controlled machine to implement the intended fabricating pattern on the workpiece by delivering electromagnetic energy to the workpiece based on the machine file or the motion plan.

16. The method of claim 15, wherein the one or more known physical characteristics of the computer-numerically-controlled machine comprise a shape of the material bed or lighting conditions within the enclosure.

17. The method of claim 16, further comprising:

measuring the thickness of the workpiece or the height of the upper surface of the workpiece relative to the material bed.

18. The method of claim 15, wherein the mapping the pixels in the one or more images to the corresponding physical locations within the computer-numerically-controlled machine in the manner that compensates for the identified one or more differences comprises mapping a particular pixel coordinate corresponding to a particular pixel in the one or more images to a particular location coordinate corresponding to a particular location within the computer-numerically-controlled machine; and wherein the generating the machine file or the motion plan comprises converting an instruction corresponding to the particular pixel coordinate to one or more commands for execution at the particular location.

19. The method of claim 15, wherein the mapping the pixels in the one or more images to the corresponding physical locations within the computer-numerically-controlled machine in the manner that compensates for the identified one or more differences comprises using the identified one or more differences to correct a warping or distortion in the one or more images.

20. The method of claim 15, further comprising:

generating a preview image comprising a view of the workpiece and one or more features of the intended fabricating pattern on the workpiece, the one or more features reflecting at least the mapping relationship between the pixels in the one or more images and the corresponding physical locations within the computer-numerically-controlled machine.

* * * * *